(12) United States Patent
Hotta et al.

(10) Patent No.: US 9,150,185 B2
(45) Date of Patent: Oct. 6, 2015

(54) SIDE AIRBAG APPARATUS

(71) Applicant: TOYODA GOSEI CO., LTD., Kiyosu-shi, Aichi-ken (JP)

(72) Inventors: Masashi Hotta, Kiyosu (JP); Yuji Sato, Kiyosu (JP); Yoshiaki Goto, Kiyosu (JP); Kensaku Honda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/141,581

(22) Filed: Dec. 27, 2013

(65) Prior Publication Data

US 2014/0210192 A1    Jul. 31, 2014

(30) Foreign Application Priority Data

Jan. 25, 2013  (JP) .................................. 2013-012409

(51) Int. Cl.
```
B60R 21/207       (2006.01)
B60R 21/233       (2006.01)
B60R 21/231       (2011.01)
B60R 21/239       (2006.01)
```

(52) U.S. Cl.
CPC ............ B60R 21/233 (2013.01); B60R 21/239 (2013.01); B60R 21/23138 (2013.01); *B60R 21/207* (2013.01); *B60R 2021/23146* (2013.01); *B60R 2021/23324* (2013.01)

(58) Field of Classification Search
CPC ................ B60R 21/207; B60R 21/233; B60R 2021/23316; B60R 2021/23324
USPC .................................... 280/730.2, 729, 743.1
See application file for complete search history.

(56) References Cited

U.S. PATENT DOCUMENTS

| | | | |
|---|---|---|---|
| 7,637,530 B2* | 12/2009 | Yamaji et al. ............... | 280/730.2 |
| 7,837,226 B2* | 11/2010 | Honda et al. ............... | 280/730.2 |
| 7,926,838 B2* | 4/2011 | Honda et al. .................. | 280/729 |
| 8,528,934 B2* | 9/2013 | Kobayshi et al. ............. | 280/740 |
| 8,651,515 B2* | 2/2014 | Baba et al. .................. | 280/730.2 |
| 8,714,584 B2* | 5/2014 | Honda et al. .................. | 280/729 |
| 8,714,588 B2* | 5/2014 | Honda et al. ............... | 280/730.2 |
| 8,770,620 B2* | 7/2014 | Hotta et al. ................ | 280/730.2 |
| 8,820,785 B2* | 9/2014 | Shibayama et al. .......... | 280/742 |
| 2006/0175809 A1* | 8/2006 | Yamaji et al. ................. | 280/729 |
| 2009/0020987 A1* | 1/2009 | Wipasuramonton et al. .  | 280/729 |
| 2012/0025499 A1* | 2/2012 | Shibayama et al. ....... | 280/730.2 |

(Continued)

FOREIGN PATENT DOCUMENTS

JP      2010-137615 A    6/2010

*Primary Examiner* — Karen Beck
(74) *Attorney, Agent, or Firm* — Posz Law Group, PLC

(57) ABSTRACT

An inflation portion of an airbag main body is divided into a first inflation chamber, a second inflation chamber in front of and adjacent to the first inflation chamber with a vertical partition in between, and a third inflation chamber below the first inflation chamber with a lateral partition in between. The vertical partition has a pressure regulator valve. Before the first inflation chamber restrains an occupant, the pressure regulator valve restricts flow of inflation gas from the first inflation chamber to the second inflation chamber. When the first inflation chamber restrains the occupant, the pressure regulator valve opens in response to a change in the tensed state of the vertical partition due to the applied external force generated by the restraint, thereby cancelling the restraint. The lateral partition has a check valve, which restricts flow of inflation gas from the third inflation chamber to the first inflation chamber.

9 Claims, 13 Drawing Sheets

(56) References Cited

U.S. PATENT DOCUMENTS

| | | | |
|---|---|---|---|
| 2013/0200598 A1* | 8/2013 | Honda et al. | 280/730.2 |
| 2014/0208567 A1* | 7/2014 | Hotta et al. | 29/428 |
| 2014/0210192 A1* | 7/2014 | Hotta et al. | 280/730.2 |
| 2015/0183393 A1* | 7/2015 | Kino et al. | |

* cited by examiner

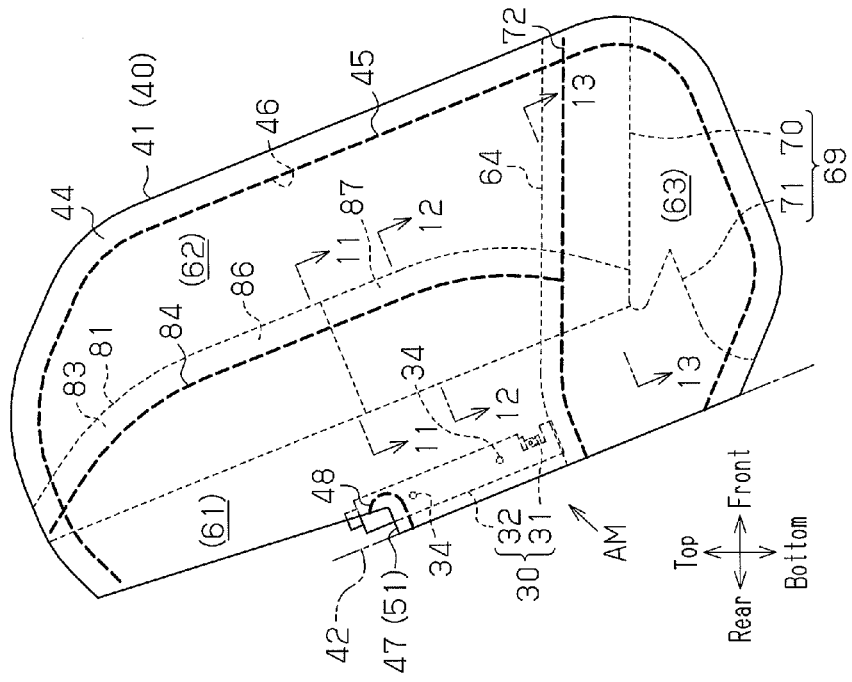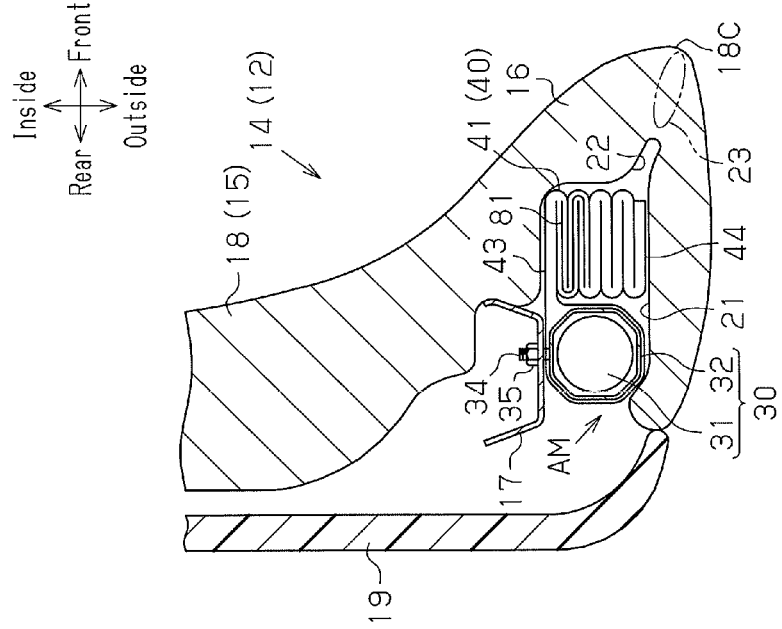

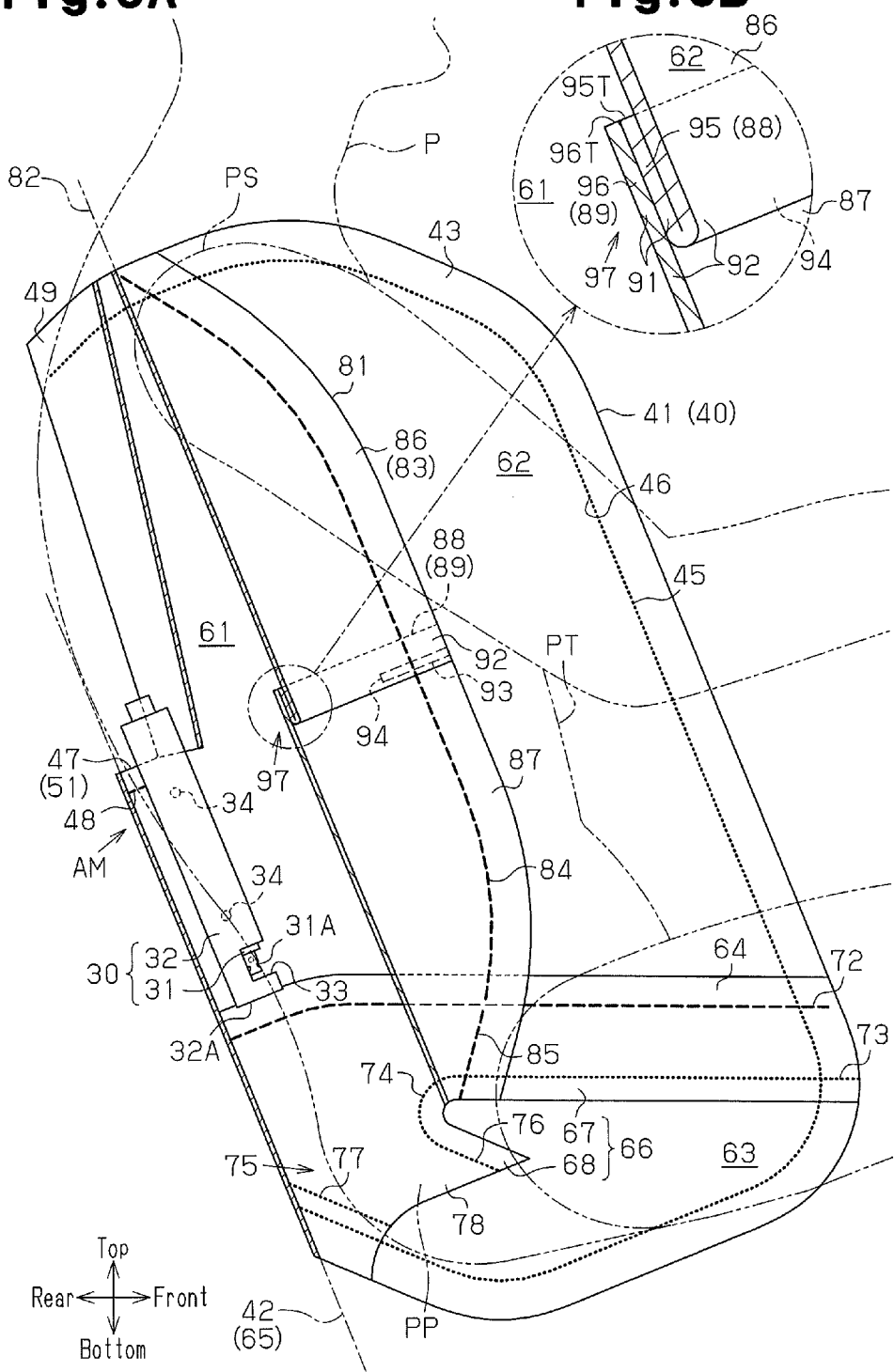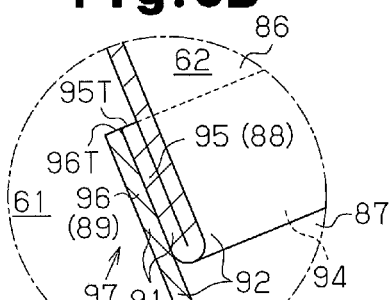

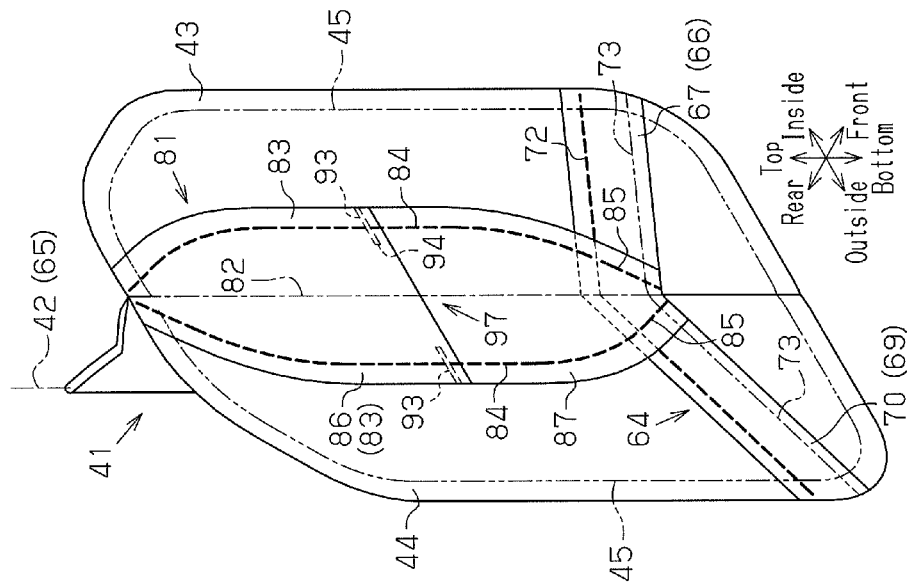
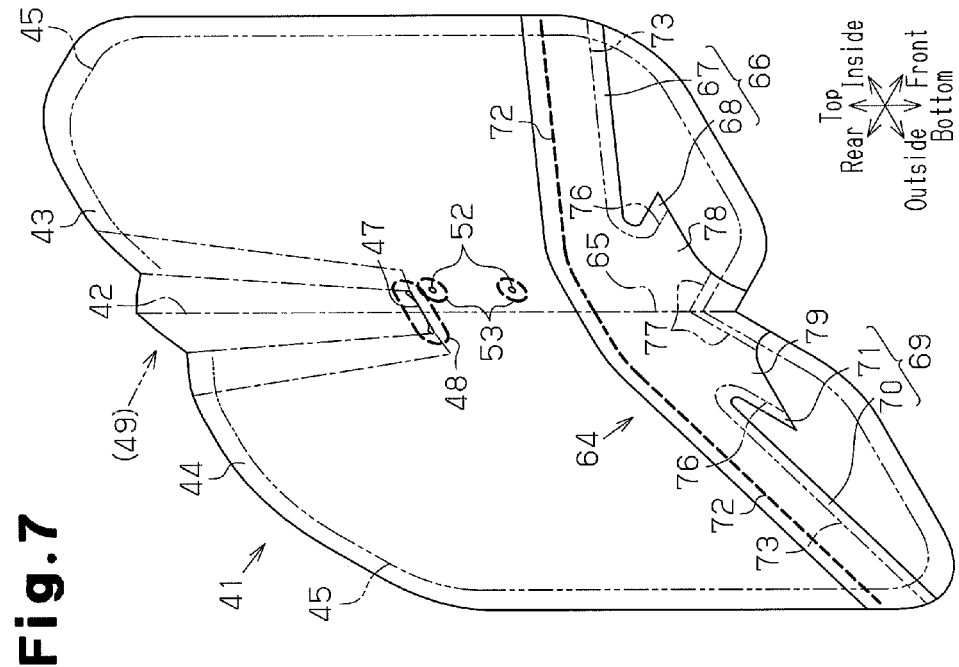

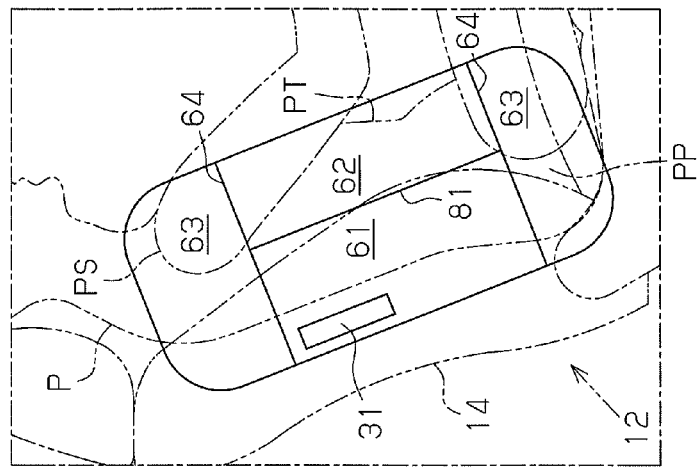
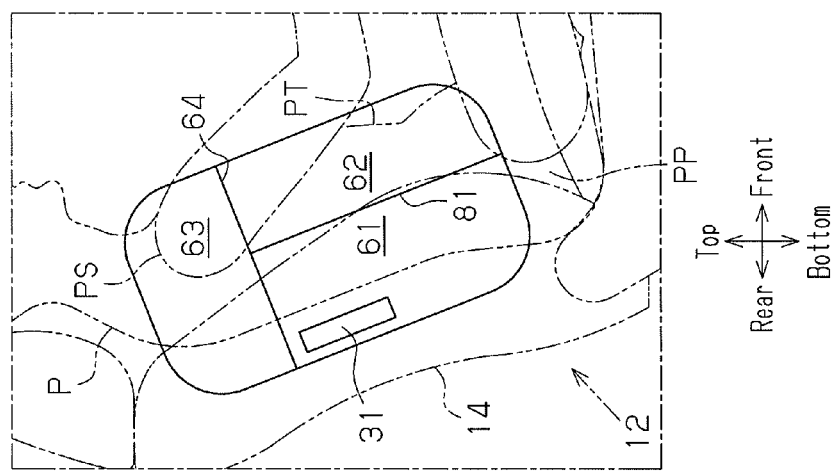
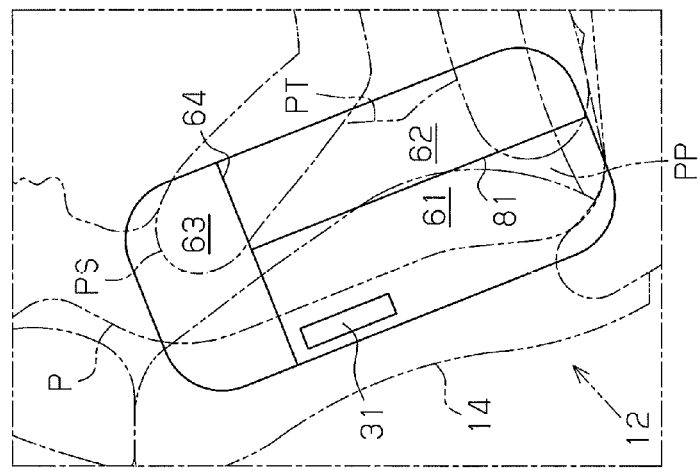

SIDE AIRBAG APPARATUS

BACKGROUND OF THE INVENTION

The present invention relates to a side airbag apparatus that protects an occupant seated in a vehicle seat from an impact by deploying and inflating an airbag on a side of the occupant when an impact is applied to a vehicle.

A side airbag apparatus having an airbag and an inflator is widely known for protecting an occupant from an impact when the impact is applied to a vehicle from a side to a vehicle seat in which the occupant is seated, for example, due to a side collision. In the side airbag apparatus, an airbag is installed in a seat back of a vehicle seat in a folded state together with an inflator. When an impact is applied from the side on a member forming a side of a vehicle (body side portion), for example, a side door, an inflator of the side airbag apparatus supplies inflation gas to an inflation portion of an airbag main body, which forms the outer shape of the airbag. The inflation gas inflates the inflation portion, so that the airbag main body is deployed and inflated. The airbag is projected forward from the vehicle seat with a part of the airbag remaining in the seat back. The airbag main body is deployed and inflated in a narrow space between the occupant and the body side portion. The deployed and inflated airbag main body is located between the occupant and the body side portion to restrain the occupant and reduces the impact from the side transmitted to the occupant via the body side portion.

In the human body, the lumbar region and the shoulder region are generally known to have a better impact resistance than the thorax. Therefore, in the case of a side airbag apparatus that protects an occupant in a large area ranging from the lumbar region to the shoulder region, it is preferable that an airbag main body protect the thorax by softening the impact to the thorax more than the impact to the lumbar region and the shoulder region.

In this regard, Japanese Laid-Open Patent Publication No. 2010-137615 discloses a side airbag apparatus that has an inflation portion divided into a plurality of inflation chambers. In the side airbag apparatus, an inflation portion 132 of an airbag main body 131 is divided into a first inflation chamber 134, a second inflation chamber 135, and a pair of upper and lower third inflation chambers 136, 137 as illustrated in FIG. 21. The first inflation chamber 134 receives inflation gas from the inflator 133 to be deployed and inflated. The second inflation chamber 135 is located in front of the first inflation chamber 134 with a vertical partition 138 in between. The upper third inflation chamber 136 is located above the first inflation chamber 134 and the second inflation chamber 135 with a lateral partition 139 in between. The lower third inflation chamber 137 is located below the first inflation chamber 134 with a lateral partition 141 in between.

The vertical partition 138 is formed by an inner tube incorporating the inflator 133. The vertical partition 138 has an opening 142, which connects the first inflation chamber 134 and the second inflation chamber 135 with each other. The upper lateral partition 139 has an opening 143, which connects the first inflation chamber 134 and the third inflation chamber 136 with each other, and a check valve 144, which prevents inflation gas in the third inflation chamber 136 from flowing back to the first inflation chamber 134 through the opening 143. The lower lateral partition 141 has an opening 145, which connects the first inflation chamber 134 and the third inflation chamber 137 with each other, and a check valve 146, which prevents inflation gas in the third inflation chamber 137 from flowing back to the first inflation chamber 134 through the opening 145.

According to the above described side airbag apparatus, inflation gas discharged from the inflator 133 is supplied to the first inflation chamber 134. Some of the inflation gas is supplied to the second inflation chamber 135 through the opening 142. Also, some of the inflation gas is supplied to the third inflation chamber 135 through the opening 143 and the check valve 144, and is supplied to the third inflation chamber 137 through the opening 145 and the check valve 146. Also, the check valves 144, 146 cause the internal pressures of the first inflation chamber 134 and the second inflation chamber 135 to be lowered and the internal pressures of the third inflation chambers 136, 137 to be raised. This prevents the internal pressures of the first inflation chamber 134 and the second inflation chamber 135 from being excessively increased at the restraint of the occupant. Also, the internal pressures of the third inflation chambers 136, 137, which have been raised to level appropriate for protecting the shoulder region and the lumbar region, are maintained.

In this manner, the third inflation chambers 136, 137 are deployed and inflated with high internal pressures beside the shoulder region and the lumbar region, which have a relatively high impact resistance in the side of the occupant, and the first inflation chamber 134 and the second inflation chamber 135 are deployed and inflated with low internal pressures beside the thorax, which has a relatively low impact resistance. Thus, the inflation portion 132 is deployed and inflated with a pressure distribution appropriate for the impact resistance of the side of the occupant, so that body parts of the occupant (the shoulder region, the lumbar region, and the thorax) are effectively protected from an impact.

In the above described airbag apparatus, when the airbag main body 131 is pressed against the occupant by the body side portion, which bulges inward due to an impact from the side, the occupant receives the load of the impact via the airbag main body 131. The load is expressed by the product of the area by which the occupant receives the pressure from the airbag main body 131 (the pressure receiving area of the occupant on the side facing the airbag main body 131) and the internal pressure of the airbag main body 131. From a viewpoint of protection of the occupant from impact, the load preferably reaches a predetermined value in a short time after the body side portion starts bulging inward, and is maintained at the value irrespective of the amount of bulging of the body side portion.

However, in the side airbag apparatus disclosed in Japanese Laid-Open Patent Publication No. 2010-137615, inflation gas starts flowing to the second inflation chamber 135 through the opening 142 in an initial state of inflation of the first inflation chamber 134, and the second inflation chamber 135 is deployed and inflated together with the first inflation chamber 134. Thus, as the amount of an inward bulging of the body side portion, the internal pressure and the pressure receiving rear are increased. The load that the occupant receives from the airbag main body 131 is gradually increased as the inward bulging of the body side portion progresses. The load reaches the predetermined value only after the body side portion bulges inward by a certain extent. Further, the load continues to increase after reaching the predetermined value and eventually exceeds the predetermined value. As a result, until the load reaches the predetermined value, the sufficient protection of the occupant from the impact is not started. After the load reaches the predetermined value, the occupant receives a load greater than the predetermined value via the airbag main body 131. Thus, there is still room for improvement regarding the restraint and protection of the occupant.

The matters described above are common to a side airbag apparatus that only has one of the third inflation chambers 136, 137.

Accordingly, it is an objective of the present invention to provide a side airbag apparatus capable of improving the occupant restraint and protection performance compared to an airbag apparatus in which an opening is provided between a first inflation chamber and a second inflation chamber, and an opening and a check valve are provided between the first inflation chamber and a third inflation chamber.

To achieve the foregoing objective, and in accordance with one aspect of the present invention, a side airbag apparatus including an airbag main body, a pressure regulator valve, and a check valve is provided. The airbag main body includes an inflation portion. The inflation portion is inflated by inflation gas supplied thereto in response to an impact applied to a side of a vehicle seat. The airbag main body is deployed forward on the side of the vehicle seat. The inflation portion includes a first inflation chamber, a second inflation chamber, a vertical partition, a third inflation chamber, and a lateral partition. The first inflation chamber is deployed and inflated by being supplied with the inflation gas. The second inflation chamber is located in front of and adjacent to the first inflation chamber. The vertical partition separates the first inflation chamber and the second inflation chamber from each other. The third inflation chamber is adjacent to and located above or below the first inflation chamber. The third inflation chamber is deployed and inflated by the inflation gas with an internal pressure that is higher than the inflation pressure of the first inflation chamber. The lateral partition separates the first inflation chamber and the third inflation chamber from each other. The vertical partition and the lateral partition each have an opening. The pressure regulator valve is provided in the vertical partition. When the first inflation chamber is inflated before starting restraining an occupant, the pressure regulator valve is closed to restrict the inflation gas from flowing from the first inflation chamber to the second inflation chamber through the opening. When the first inflation chamber restrains the occupant, the pressure regulator valve opens in response to a change in the tensed state of the vertical partition due to an applied external force generated by the restraint, thereby cancelling the restraint. The check valve is provided in the lateral partition to restrict flow of the inflation gas from the third inflation chamber to the first inflation chamber.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a partially cross-sectional plan view showing the internal structure of a side portion of the seat back in which the airbag module of the embodiment is installed;

FIG. 4 is a side view illustrating the airbag module in a state where the airbag main body is in an uninflated and deployed state in the embodiment;

FIG. 5A is a partial cross-sectional side view showing the internal structure of the airbag module shown in FIG. 4, together with an occupant;

FIG. 5B is an enlarged partial cross-sectional side view illustrating a part of FIG. 5A;

FIG. 7 is an explanatory perspective view showing a first joining step of the airbag according to the embodiment;

FIG. 8 is an explanatory perspective view showing a second joining step of the airbag according to the embodiment;

FIGS. 20A to 20C are partial side views each illustrating an airbag according to a modification, together with a vehicle seat and an occupant.

DETAILED DESCRIPTION OF THE PREFERRED EMBODIMENTS

A side airbag apparatus according to one embodiment of the present invention will now be described with reference to FIGS. 1 to 19.

The side airbag apparatus of the present embodiment is mounted on a vehicle. In the following, the direction in which a vehicle advances forward will be referred to as the front, and reverse direction will be referred to as the rear. The middle of the widthwise direction of the vehicle is used as reference in the widthwise direction of the vehicle. A side closer to the middle of the widthwise direction will be referred to as "inner side" of the vehicle, while a side farther from the middle of the widthwise direction will be referred to "outer side" of the vehicle.

It is provided that an average sized occupant (adult) is seated on a vehicle seat in a predetermined posture (normal posture).

Figure 1:
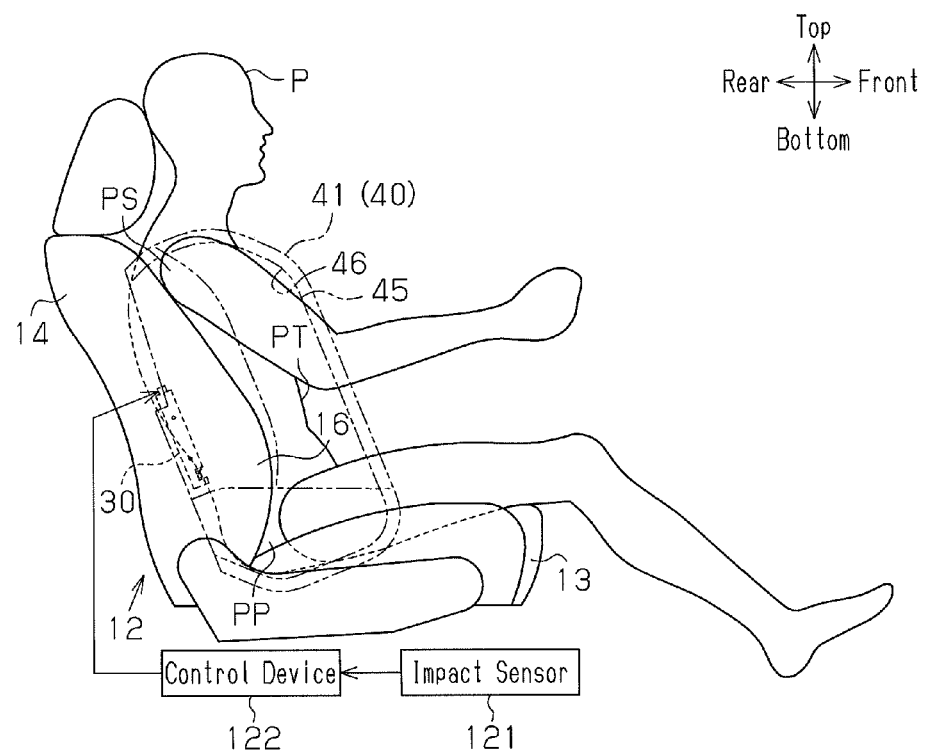
FIG. 1 is a side view illustrating a vehicle seat in which a side airbag apparatus according to one embodiment is mounted, together with an occupant and an airbag.
Figure 2:
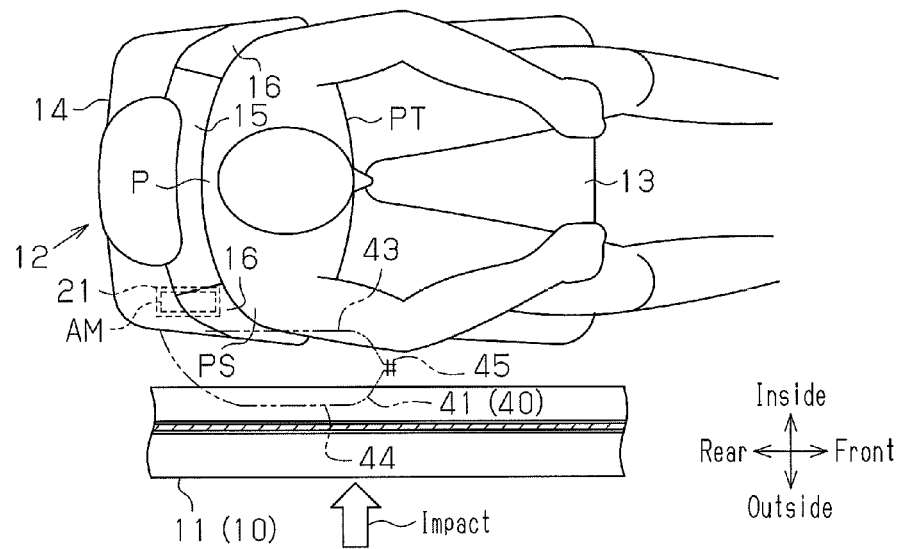
FIG. 2 is a cross-sectional plan view showing the positional relationship of the vehicle seat, the airbag, the occupant, and a body side portion in the embodiment.

As shown in FIGS. 1 and 2, a vehicle seat 12 is arranged on the inner side (upper side as viewed in FIG. 2) of a body side portion 11 of a vehicle 10. The body side portion 11 refers to a vehicle component that is located at a side of the vehicle 10, and mainly corresponds to doors and pillars. For example, a part of the body side portion 11 corresponding to the front seat includes a front door and a center pillar (B-pillar). A part of the body side portion 11 corresponding to the rear seat includes a rear part of the side door (rear door), a C-pillar, a front part of the wheel well, a rear quarter.

The vehicle seat 12 includes a seat cushion 13 and a seat back 14. The seat back 14 extends upward from the rear end of the seat cushion 13 and includes a tilt adjusting mechanism (not shown) that adjusts the tilt angle of the seat back 14. The vehicle seat 12 is arranged in the vehicle 10 such that the seat back 14 faces forward of the vehicle 10. The widthwise direction of the thus arranged vehicle seat 12 matches with the width direction of the vehicle 10.

The seat back 14 includes a seat back main body 15 and a pair of side supports 16, which is provided on both sides of the seat back main body 15 in the widthwise direction. The seat back main body 15 is tilted rearward, and supports the upper body of an occupant P from the rear. The side supports 16 protrude forward from the seat back main body 15, and restrict the vehicle widthwise movement of the upper body of the occupant P, who is seated on the seat cushion 13 and leaning against the seat back main body 15.

The internal structure of the outer side portion of the seat back 14 including the side support portion 16 on the outer side will now be described.

A seat frame, which forms a framework of the seat back 14, is incorporated in the seat back 14. As shown in FIG. 3, a part of the seat frame is located in the outer side (lower side as viewed in FIG. 3) of the seat back 14. The part is referred to as a side frame portion 17. The side frame portion 17 is formed by bending a metal plate. A seat pad 18, which is made of an elastic material such as urethane foam, is provided on the front side of the seat frame, which includes the side frame portion 17. Also, a hard back board 19, which is formed, for example, of plastic, is arranged on the back of the seat frame. Although the seat pad 18 is coated with a cover, the cover is not illustrated in FIG. 3. The same applies to FIG. 15.

In the seat pad 18, a storage portion 21 is provided in the outer side portion of the side frame portion 17. The storage portion 21 is located at a middle part of the seat back 14 in the up-down direction and in the vicinity of and diagonally rearward of the occupant P seated in the vehicle seat 12 (see FIGS. 1 and 2). The storage portion 21 accommodates an airbag module AM, which forms a main part of the side impact airbag apparatus.

A slit 22 is formed to extend from the outer front corner of the storage portion 21. The slit 22 extends diagonally forward and toward the exterior. A part between a front corner 18C of the seat pad 18 and the slit 22, that is, a part surrounded by a line formed by a long dash alternating with two short dashes in FIG. 3 forms a breakable portion 23, which is designed to be broken by an airbag 40.

The airbag module AM, which is installed in the seat back 14, includes as its main components the airbag 40 and an inflator assembly 30. Each of these components will now be described.

<Inflator Assembly 30>

As shown in FIGS. 3 to 5B, the inflator assembly 30 includes a gas generator, which is an inflator 31, and a retainer 32, which surrounds the inflator 31. In the present embodiment, a pyrotechnic type inflator is employed as the inflator 31. The inflator 31 is substantially columnar and accommodates a gas generating agent (not shown), which generates inflation gas. A gas outlet 31A is provided at the lower end of the inflator 31. A harness (not shown), which is wiring for applying activating signals to the inflator 31, is connected to the upper end of the inflator 31.

In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The retainer 32 functions as a diffuser for controlling the direction of discharged inflation gas and also functions to fasten the inflator 31, together with the airbag 40, to the side frame portion 17 (see FIG. 3). Most of the retainer 32 is formed by bending a plate such as a metal plate into a cylindrical shape that extends substantially in the up-down direction. At least the lower end of the retainer 32 forms an open end 32A. The retainer 32 has a window 33 in front of the gas outlet 31A. A considerable amount of inflation gas discharged through the gas outlet 31A is delivered to the exterior of the retainer 32 through the open end 32A and the window 33. That is, the inflation gas is discharged downward and forward. The present embodiment is configured such that a greater amount of inflation gas is discharged from the open end 32A than from the window 33.

Bolts 34 are fixed to the retainer 32. The bolts 34 serve as securing members for attaching the retainer 32 to the side frame portion 17. In other words, the bolts 34 are indirectly fixed to the inflator 31 by means of the retainer 32. The inflator 31 and the retainer 32 of the inflator assembly 30 may be an integrated member.

<Airbag Main Body 41>

As shown in FIGS. 1 and 2, the outer shape of the airbag 40 is formed by an airbag main body 41.

If an impact is applied to the body side portion 11 of the vehicle 10 due to a side collision or the like when the vehicle 10 is moving, the inflator 31 supplies inflation gas to the airbag main body 41. The airbag main body 41 is projected forward from the seat back 14 with a part of the airbag main body 41 remaining in the seat back 14. The airbag main body 41 is configured to be deployed and inflated in the vicinity of the occupant P seated in the vehicle seat 12 to restrain and protect the occupant from the impact.

FIG. 4 shows the airbag module AM in the state in which the airbag main body 41 is deployed in a planar form without being filled with the inflation gas G. That is, FIG. 4 shows the airbag module AM in an uninflated and deployed state. FIG. 5 shows, together with the occupant P, the airbag module AM in which the airbag main body 41 in the uninflated and deployed state of FIG. 4 is cut at the center portion of the vehicle widthwise direction to show the internal structure of the airbag module AM.

As shown in FIGS. 4, 5A, and 5B, the airbag main body 41 is formed by folding a single fabric piece (also referred to as a base fabric, or a fabric panel) along a folding line 42 set at the center portion to be overlapped in the vehicle widthwise direction, and joining the overlapped portion into a bag shape.

In the present embodiment, to distinguish the two overlapped portions of the airbag main body 41, the part located on the inner side is referred to as a main body fabric portion 43 (see FIGS. 5A and 5B), and the part located on the outer side is referred to as a main body fabric portion 44 (see FIG. 4).

In the present embodiment, the fabric piece is folded in half such that the folding line 42 is located at the rear end of the airbag main body 41. However, the fabric piece may be folded in half such that the folding line 42 is located at another end such as the front end, the upper end, or the lower end. The airbag main body 41 may also be formed of two fabric pieces divided along the folding line 42. In this case, the airbag main body 41 is formed by overlapping the two fabric pieces in the vehicle widthwise direction, and joining the fabric pieces into a bag shape. Furthermore, the airbag main body 41 may be formed of three or more fabric pieces.

Figure 6:
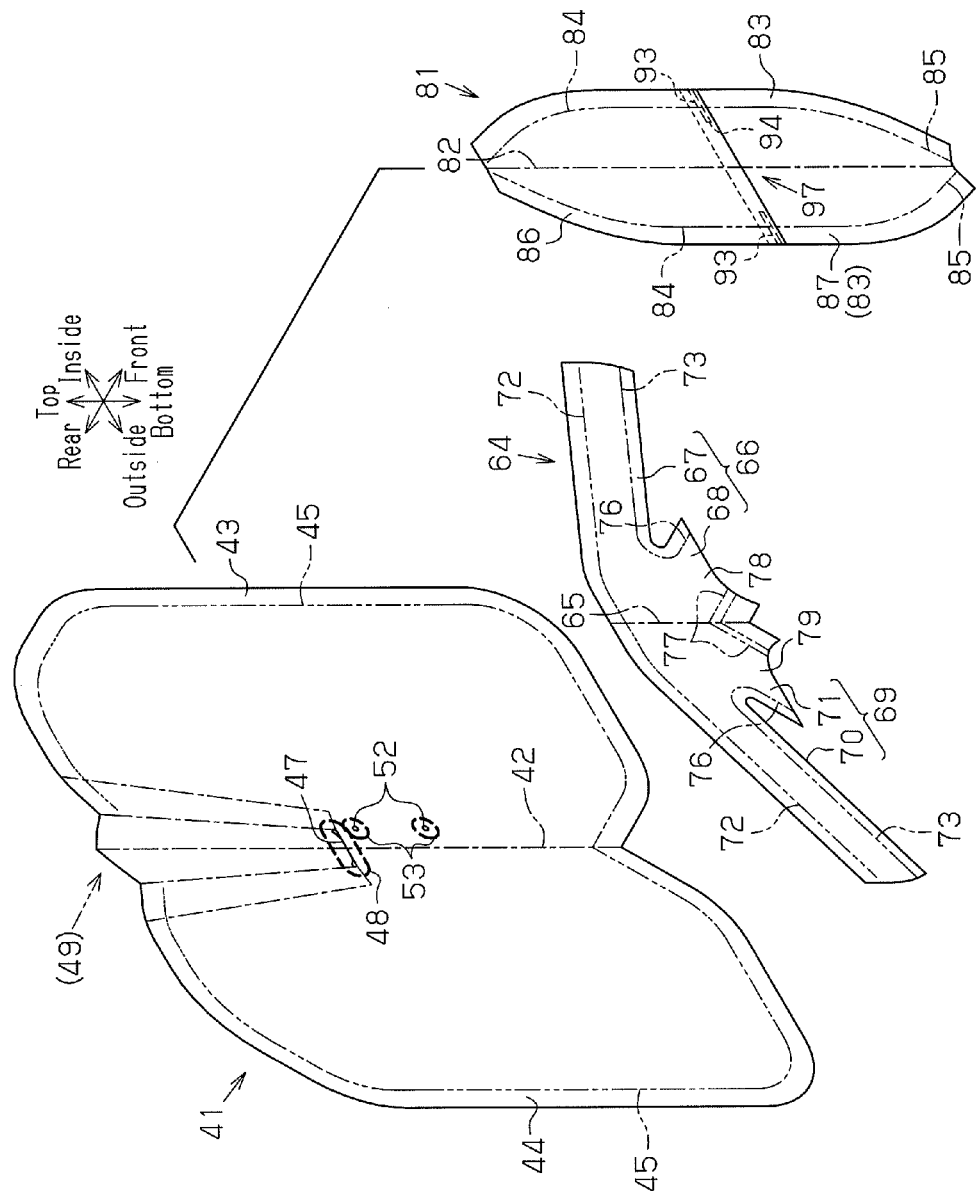
FIG. 6 is an exploded perspective view showing a main body fabric portion, a lateral partition, and a vertical partition, which are components of the airbag of the embodiment.

In the airbag main body 41, the outer shapes of the main body fabric portions 43, 44 are symmetric with respect to the folding line 42 (see FIG. 6). The shape and size of the main body fabric portions 43, 44 are set to be able to occupy the region corresponding to most part of the upper body of the occupant P seated on the vehicle seat 12 (the section from a lumbar region PP to a shoulder region PS) when the airbag main body 41 is deployed and inflated between the vehicle seat 12 and the body side portion 11.

The main body fabric portions 43, 44 are preferably formed of a material having high strength and flexibility to be easily folded. The material may be, for example, woven cloth formed of polyester threads or polyamide threads.

The main body fabric portions 43, 44 are joined at peripheral joint portion 45 provided at the peripheries of the main body fabric portions 43, 44. In the present embodiment, most of the peripheral joint portion 45 is formed by sewing with sewing threads a part of the peripheries of the main body fabric portions 43, 44 except the rear end (the part in the vicinity of the folding line 42). These features are common to an endless joint portion 48, annular joint portions 53, outer joint portions joint portions 72, 84, 85, inner joint portions 73, 93, and joint portions 76, 77, which will be discussed below.

Three types of lines represent sewing portions in FIGS. 4 to 10 and 16. The first type of line includes thick lines with a certain length arranged intermittently and represents sewn portions as viewed from the side (refer to the peripheral joint portion 45 in FIG. 4). The second type of line includes thin lines with a certain length arranged intermittently and represents the state of the sewing threads that are located behind the outer side main body fabric portion 44 and cannot be seen directly (refer to the inner joint portion 93 in FIG. 5A). The third type of line includes dots arranged at predetermined intervals and represents the state of the sewing thread at the position between the main body fabric portions 43, 44, which are the target of sewing, and between structural fabric portions 66, 69 (see the peripheral joint portion 45 in FIG. 5A). That is, the drawings in which the sewn part is represented by the third line type show the structure along the cross-section that passes through the sewing threads in the sewn portions.

As shown in FIGS. 4 to 6A, the space between the main body fabric portions 43, 44 and surrounded by the peripheral joint portion 45 serves as an inflation portion 46. When being deployed and inflated by inflation gas beside the upper body of the occupant P, the inflation portion 46 restrains the most part of the upper body and protects the upper body from the impact.

The peripheral joint portion 45 may be formed by a method other than sewing using sewing threads, but may be formed by, for example, using an adhesive. This also applies to the endless joint portion 48, the annular joint portions 53, the outer joint portions joint portions 72, 84, 85, the inner joint portions 73, 93, and the joint portions 76, 77, which will be discussed below.

The main body fabric portions 43, 44 have a slit 47, which is located at the rear end and in a middle portion in the up-down direction (see FIG. 7). The slit 47 extends forward and over the folding line 42. The main body fabric portions 43, 44 also have the endless joint portion 48 about the slit 47. The endless joint portion 48 reinforces the part about the slit 47 in the main body fabric portions 43, 44, thereby preventing the part from being torn.

A part of the main body fabric portions 43, 44 above the slit 47 forms an inward folding portion 49, which is folded inward of the remaining parts. The upper end of the inward folding portion 49 is joined to the remaining parts of the main body fabric portions 43, 44 by the peripheral joint portion 45. When the inward folding portion 49 is formed, the slit 47 is opened substantially in a circular shape to form an insertion port 51 for the inflator assembly 30.

The inner side main body fabric portion 43 has bolt holes 52 (the number of which is two in the present embodiment), which are located in the vicinity of the folding line 42 and below the slit 47. The bolts 34 of the retainer 32 (see FIG. 3) are passed through the bolt holes 52. An annular joint point 53 is provided about each bolt hole 52. The annular joint portions 53 reinforce the parts about the bolt holes 52 in the main body fabric portion 43, thereby preventing these parts from being torn.

As shown in FIG. 5A, the inflation portion 46 is divided into a first inflation chamber 61, which is deployed and inflated by being supplied with inflation gas, a second inflation chamber 62, which is located in front of the first inflation chamber 61 with a vertical partition 81 in between, and a third inflation chamber 63, which is located below the first and second inflation chambers 61, 62 with a lateral partition 64 in between. The vertical partition 81 and the lateral partition 64 each have the same structure as a member generally referred to as a tether.

<Lateral Partition 64>

As shown in FIGS. 5A to 6, the lateral partition 64 is formed by a single fabric piece that is formed of a material such as woven fabric having high strength and flexibility to be easily folded. The lateral partition 64 is formed by folding the fabric piece in half along a folding line 65 set at the center portion to be overlaid onto itself in the vehicle widthwise direction, and placing the overlaid portion between lower parts of the main body fabric portions 43, 44. The lower parts of the main body fabric portions 43, 44 are parts corresponding to the boundary between the lumbar region PP and the thorax PT of the occupant P.

The lateral partition 64 may also be formed of two fabric pieces divided along the folding line 65.

Figure 14:
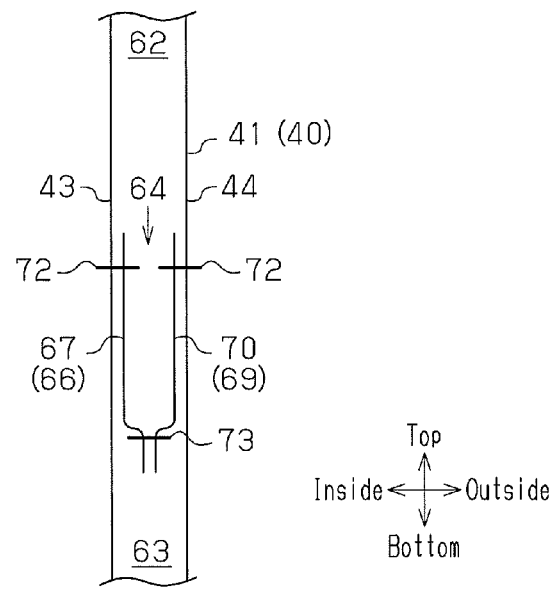
FIG. 14 is a partial cross-sectional view taken along line 14-14 of FIG. 13, schematically showing the internal structure of the airbag.

To distinguish the two overlapped portions of the lateral partition 64, the part located on the inner side is referred to as an inner side structural fabric portion 66, and the part located on the outer side is referred to as an outer side structural fabric portion 69 (see FIG. 14).

The main part of the inner side structural fabric portion 66 is formed by a main body forming fabric portion 67, which extends from the rear end to the front end of the main body fabric portion 43. The main body forming fabric portion 67 is inclined to be lowered toward the front end. In addition to the main body forming fabric portion 67, the inner side structural fabric portion 66 includes an extension 68, which extends forward and downward from the rear end of the main body forming fabric portion 67.

The main part of the outer side structural fabric portion 69 is formed by a main body forming fabric portion 70, which extends from the rear end to the front end of the main body fabric portion 44. The main body forming fabric portion 70 is inclined to be lowered toward the front end. In addition to the main body forming fabric portion 70, the outer side structural fabric portion 69 includes an extension 71, which extends forward and downward from the rear end of the main body forming fabric portion 70.

Figure 18:
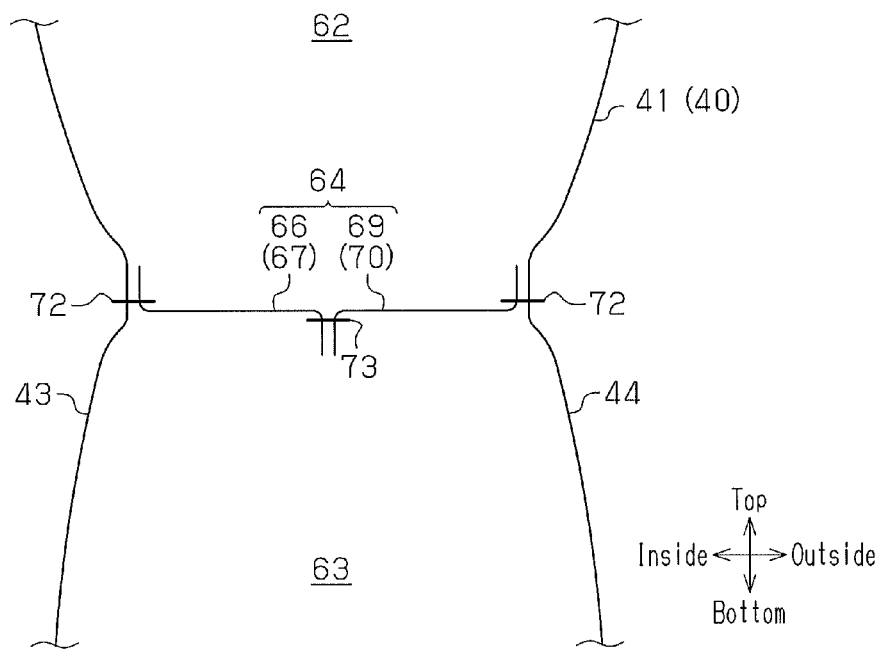
FIG. 18 is a partial cross-sectional view corresponding to FIG. 14, showing the internal structure of the airbag when the lateral partition of FIG. 14 is tensed.

The lateral partition 64, which is folded in half as described above, is located between the main body fabric portions 43, 44 with the folding line 65 matched with the folding line 42 (refer to FIGS. 14 and 18). The inner side main body forming fabric portion 67 has an outer joint portion 72 formed along the upper periphery. The inner side main body forming fabric portion 67 is joined to the inner side main body fabric portion 43 by the outer joint portion 72. Likewise, the outer side main body forming fabric portion 70 has an outer joint portion 72 formed along the upper periphery. The outer side main body forming fabric portion 70 is joined to the outer side main body fabric portion 44 by the outer joint portion 72. Further, the main body forming fabric portions 67, 70 are joined to each other by an inner joint portion 73 located at the lower peripheries. When the lateral partition 64 is tensed, upper parts of the main body forming fabric portions 67, 70 are brought closer to the main body fabric portions 43, 44, and lower parts of the main body forming fabric portions 67, 70 are separated away from the main body fabric portions 43, 44.

Further, the front ends of the main body forming fabric portions 67, 70 are joined to (sewn together with) the front ends of the main body fabric portions 43, 44 by the peripheral joint portion 45 (refer to FIGS. 5A and 5B). A space of the inflation portion 46 below the lateral partition 64 forms the third inflation chamber 63, which is deployed and inflated beside the lumbar region PP of the occupant P seated in the vehicle seat 12.

When the inflation portion 46 is deployed and inflated, the lateral partition 64 is tensed in the vehicle widthwise direction to limit the thickness of the inflation portion 46 in the same direction (see FIG. 18).

<Vertical Partition 81>

Figure 11:
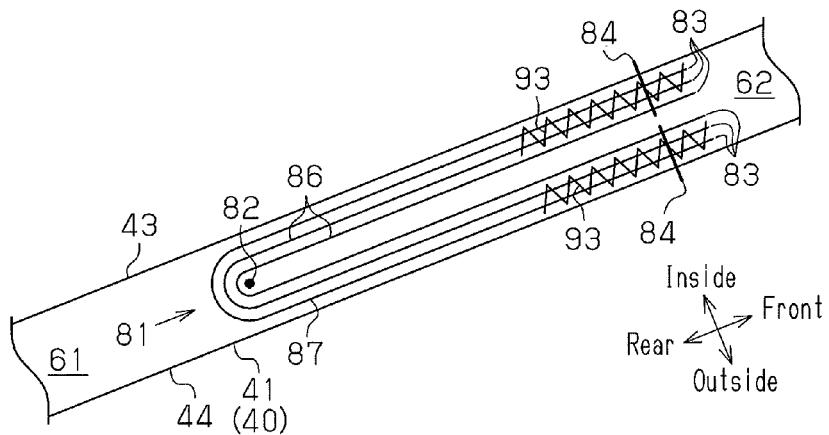
FIG. 11 is a partial cross-sectional view taken along line 11-11 of FIG. 4, schematically showing the internal structure of the airbag.
Figure 12:
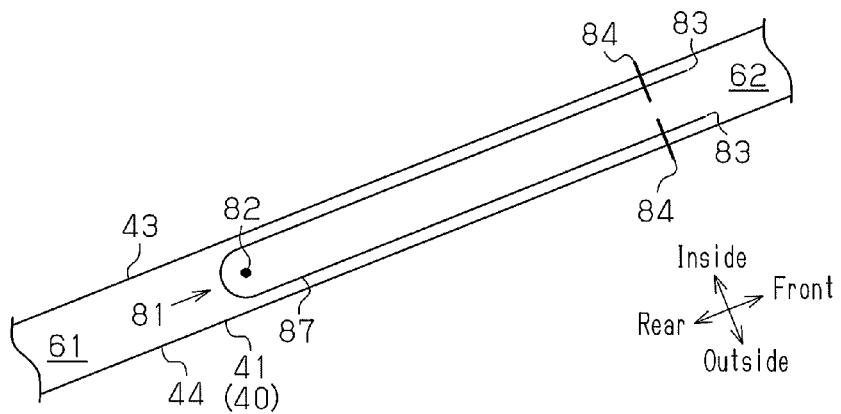
FIG. 12 is a partial cross-sectional view taken along line 12-12 of FIG. 4, schematically showing the internal structure of the airbag.
Figure 13:
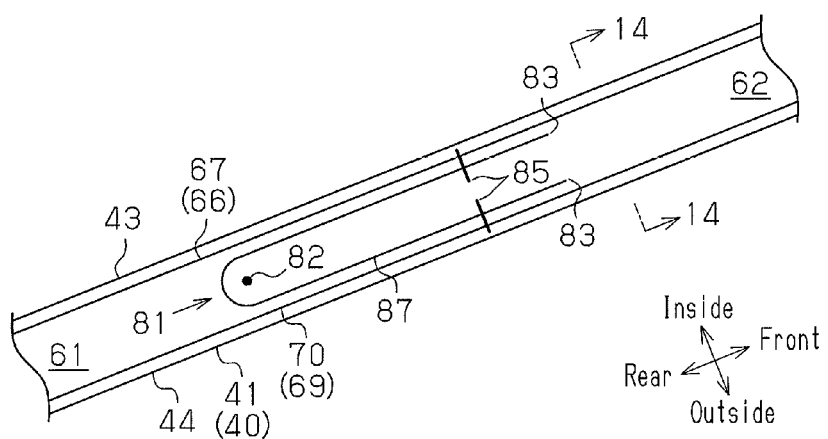
FIG. 13 is a partial cross-sectional view taken along line 13-13 of FIG. 4, schematically showing the internal structure of the airbag.

FIG. 11 shows a cross-sectional structure taken along line 11-11 of FIG. 4, and FIG. 12 shows a cross-sectional structure taken along line 12-12 of FIG. 4. FIG. 13 shows a cross-sectional structure taken along line 13-13 of FIG. 4, and FIG. 14 shows a cross-sectional structure taken along line 14-14 of FIG. 13. In FIGS. 11 to 14, the thickness of each component is omitted. The inner joint portions 93 are represented as zigzag lines in FIG. 11. As shown in FIGS. 5A, 5B, 11, and 12, when the airbag main body 41 is in the uninflated and deployed state, the vertical partition 81 is folded in half along a folding line 82, which extends in the up-down direction, between the main body fabric portions 43, 44, so that opposite peripheries 83, which face each other, are brought close to each other. The folded vertical partition 81 is arranged in the inflation portion 46, that is, between the main body fabric portions 43, 44 with the folding line 82 located upstream of the peripheries 83 (at a position closer to the inflator assembly 30). The vertical partition 81 extends in the up-down direction to intersect with the lateral partition 64.

As shown in FIGS. 4 and 8, the folded vertical partition 81 is joined to the airbag main body 41 at the upper end. That is, the upper end of the vertical partition 81 is joined to (sewn together with) the upper ends of the main body fabric portions 43, 44 by the peripheral joint portion 45.

Also, the folded vertical partition 81 is arranged between the structural fabric portions 66, 69 at the lower end and overlaid onto the rear parts of the main body forming fabric portions 67, 70. The lower end of the folded vertical partition 81 is joined to (sewn together with) the main body forming fabric portions 67, 70 of the lateral partition 64 by the inner joint portion 73.

As shown in FIG. 6, when the vertical partition 81 is tensed into a planar shape as the first inflation chamber 61 is deployed and inflated, the dimension in the vertical direction along the folding line 82 is longer than the dimension along the lateral direction, which is perpendicular to the folding line 82. As shown in FIG. 8, parts of the tensed vertical partition 81 that are not overlaid onto the main body forming fabric portions 67, 70 are joined to the main body fabric portions 43, 44 by outer joint portions 84 provided along the peripheries 83, which face each other in the lateral direction (the vehicle widthwise direction). Parts of the tensed vertical partition 81 that are overlaid onto the main body forming fabric portions 67, 70 are joined only to the main body forming fabric portions 67, 70 by outer joint portions 85 provided along the lower parts of the peripheries 83 (see FIG. 13).

The vertical partition 81 is located between the main body fabric portions 43, 44 by the above described joining operation. When the airbag main body 41 is in the uninflated and deployed state, the vertical partition 81 is folded in half (see FIGS. 5A, 5B and 11 to 13). When the first inflation chamber 61 is deployed and inflated, the vertical partition 81 is tensed in the lateral direction (the vehicle widthwise direction, refer to FIG. 16) to limit the thickness of the first inflation chamber 61.

When inflation chambers in the inflation portion 46 that are above the lateral partition 64 is deployed and inflated, the vertical partition 81 is located in the vicinity of the boundary between the rear half and the front half of the upper body of the occupant P. An inflation chamber that is above the lateral partition 64 and rearward of the vertical partition 81 forms the first inflation chamber 61, to which inflation gas from the inflator 31 is first supplied. An inflation chamber forward of the vertical partition 81 forms the second inflation chamber 62. The first inflation chamber 61 is deployed and inflated beside the shoulder region PS and the rear half of the thorax PT in the upper body of the occupant P, thereby restraining and protecting the shoulder region PS and the rear half of the thorax PT. The second inflation chamber 62 is deployed and inflated beside the front half of the thorax PT, thereby restraining and protecting the front half of the thorax PT.

Figure 16:
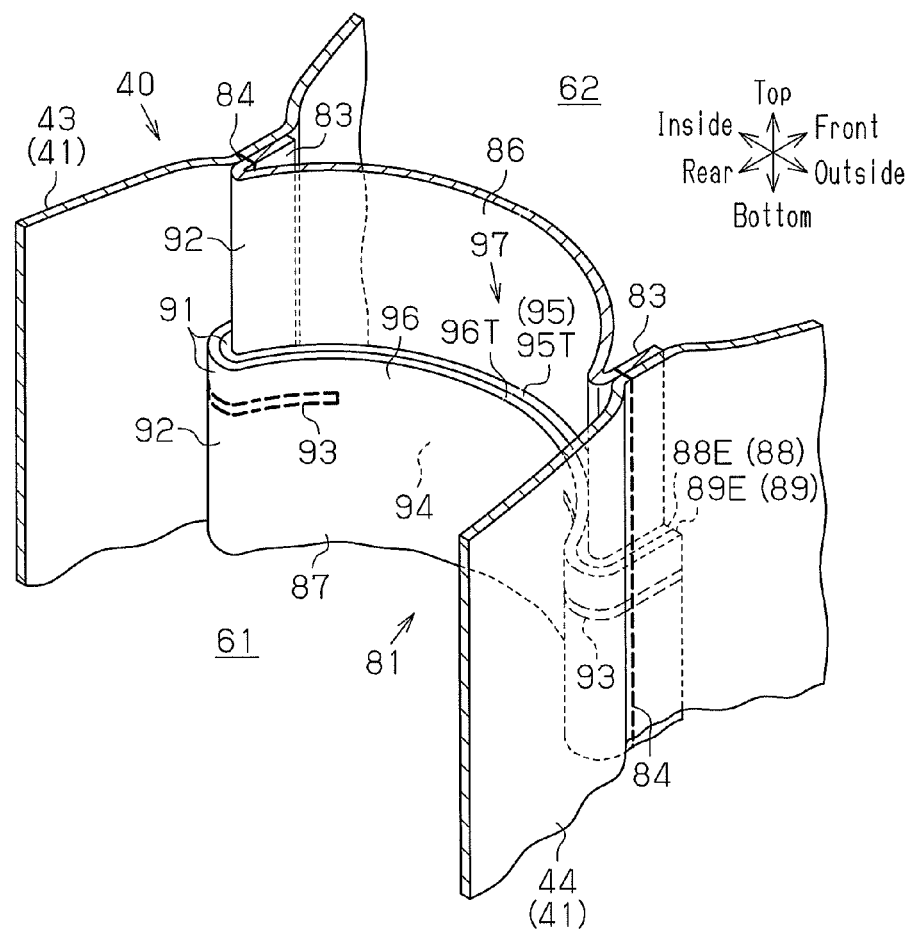
FIG. 16 is a partial perspective view showing a pressure regulator valve and the surroundings when the vertical partition of the embodiment is tensed.

As illustrated in FIGS. 8 and 16, the vertical partition 81 has two fabric pieces 86, 87, which are arranged in the vertical direction (the up-down direction). The vertical partition 81 is formed of a material such as woven fabric having high strength and flexibility to be easily folded.

The upper and lower fabric pieces 86, 87 have ends 88, 89 with edges 88E, 89E, respectively. In a state in which the edges 88E, 89E are matched with each other as shown in FIG. 16, the ends 88, 89 are overlaid onto each other in a band-like shape to form a pair of overlapping portions 91. The upper and lower fabric pieces 86, 87 are joined to each other at the inner joint portion 93, which extends in the lateral direction (the vehicle widthwise direction) at the boundary between the overlapping portions 91 and the remaining non-overlapping portions 92. The boundary is displaced from the edges 88E, 89E in one of the upward and downward directions (the downward direction in the present embodiment) by a predetermined distance.

As shown in FIG. 5A, most of the inflator assembly 30 is arranged to extend substantially in the up-down direction when accommodated in the rear end portion of the airbag main body 41. The upper portion of the inflator assembly 30 extends through insertion port 51 to be exposed to the outside of the airbag main body 41. The bolts 34 of the retainer 32 are passed through the bolt holes 52. The insertion of the bolts 34 engages the inflator assembly 30 to the airbag main body 41 in a state where the position is determined with respect to the airbag main body 41. In this state, the gas outlet 31A is located at a position that is rearward of the first inflation chamber 61 and in the vicinity of the third inflation chamber 63.

The lateral partition 64 has an opening 74 and a check valve 75, and the vertical partition 81 has an opening 94 and a pressure regulator valve 97.

<Opening 74 and Check Valve 75>

As shown in FIGS. 5A, 5B, and 6, the opening 74 connects, in the inflation portion 46, the inflation chamber below the lateral partition 64 (the third inflation chamber 63) with an inflation chamber above the lateral partition 64 (the first inflation chamber 61).

The inner joint portion 73 of the lateral partition 64 is disjoined in rear parts of the main body forming fabric portion 67, 70. In other words, the inner joint portion 73, which joins the main body forming fabric portions 67, 70 to each other, is absent in an area including the folding line 65. In this manner, the opening 74 is formed by a disjoined part where the inner joint portion 73 is not provided.

The check valve 75 is configured to restrict the flow of inflation gas at the opening 74. That is, the check valve 75 allows inflation gas to flow from the first inflation chamber 61 to the third inflation chamber 63, but restricts the flow in the opposite direction.

Front peripheries of the folded extensions 68, 71 are joined to each other by the joint portions 76 formed along the peripheries. The upper end of the joint portion 76 is connected to the rear end of the joint portion 73. Rear parts of the folded extensions 68, 71 are joined to each other by the joint portions 77 formed along the rear peripheries. The joint portions 76, 77 are inclined to be lowered toward the front ends. Further, parts of the folded extensions 68, 71 that are rearward of the joint portions 77 joined to (sewn together with) the rear lower ends of the main body fabric portions 43, 44 by the folded extensions 68, 71. A part of the inner side extension 68 that is surrounded by the opening 74 and the joint portions 76, 77 forms a valve body 78 of the check valve 75. Also, a part of the outer side extension 71 that is surrounded by the opening 74 and the joint portions 76, 77 forms a valve body 79 of the check valve 75. The check valve 75 allows flow of inflation gas when one of the valve bodies 78, 79 is separated from the other. This state of the check valve 75 is referred to as a valve opening state. The check valve 75 restricts flow of inflation gas when the valve bodies 78, 79 contact each other in at least parts thereof. This state of the check valve 75 is referred to as a valve closing state.

<Opening 94 and Pressure Regulator Valve 97>

As shown in FIGS. 5A, 5B, and 16, the opening 94 and the pressure regulator valve 97 are located substantially at a center in the vertical direction and the lateral direction. Specifically, the inner joint portion 93 in the vertical partition 81 is disjoined at a part (an area including the folding line 82 in the present embodiment). In other words, the inner joint portion 93, which joins the upper and lower fabric pieces 86, 87 to each other, is absent at a part that extends across the folding line 82 in the boundary between the overlapping portions 91 and the non-overlapping portions 92. A disjoined part where the joint portion 93 is not provided forms an opening 94, which is a slit that extends in the lateral direction (the vehicle widthwise direction) and connects the first inflation portion 61 and the second inflation portion 62 to each other. The lateral direction (the vehicle widthwise direction) is the same as the direction in which the impact is applied to the vehicle 10.

The pressure regulator valve 97 adjusts the flow of inflation gas at the opening 94, thereby regulating the internal pressures in the first inflation chamber 61 and the second inflation chamber 62. More specifically, the pressure regulator valve 97 is closed before the first inflation chamber 61 is inflated and restrains the occupant P, thereby restricting the outflow of inflation from the first inflation chamber 61 to the second inflation chamber 62 through the opening 94. When the first inflation chamber 61 restrains the occupant P, the pressure regulator valve 97 opens in response to a change in the tensed state of the vertical partition 81 due to the applied external force generated by the restraint, thereby cancelling the restraint.

As shown in FIG. 16, a part of the overlapping portion 91 that is between the opening 94 and the edge 88E forms a valve body 95 of the pressure regulator valve 97, and a part of the overlapping portion 91 that is between the opening 94 and the edge 89E forms a valve body 96 of the pressure regulator valve 97. When the valve bodies 95, 96 contact each other at least partially, for example, at the distal ends 95T, 96T, the flow of the inflation gas through between the valve bodies 95, 96 is restricted (see FIGS. 17A, 17B). This state of the pressure regulator valve 97 is referred to as a valve closing state. Also, when the opening 94 is opened, and the entire valve body 95 is separated from the entire valve body 96, inflation gas is allowed to flow through between the valve bodies 95, 96 (see FIG. 17C). This state of the pressure regulator valve 97 is referred to as a valve opening state.

Further, the overlapping portions 91, which have the valve bodies 95, 96, are located in the first inflation chamber 61 before the inflation portion 46 is deployed and inflated.

At the boundary between the overlapping portions 91 and the non-overlapping portions 92, the overlapping portions 91 are folded upward or downward (upward in the present embodiment) to be overlaid onto one of the non-overlapping portions 92. Further, the folded band-like overlapping portions 91 are joined to (sewn together with) the main body fabric portions 43, 44 of the airbag main body 41 and the non-overlapping portions 92 at the ends in the direction along the inner joint portion 93 (the lateral direction, the vehicle widthwise direction) by the outer joint portions 84 (see FIGS. 5A and 8).

The airbag 40 is constructed as described above.

A method for manufacturing the airbag 40 will now be described with reference to FIGS. 7 to 10. Particularly, a method for providing the lateral partition 64 and the vertical partition 81 between the main body fabric portions 43, 44 will be described. In the manufacture, the following first to fourth joining steps are sequentially performed.

<First Joining Step>

As shown in FIG. 7, the airbag main body 41 and the lateral partition 64 are spread in the first joining step. The slit 47, the endless joint portion 48, the bolt holes 52, and the annular joint portions 53 are formed in the airbag main body 41 in advance.

With the folding line 65 matched with the folding line 42, the lateral partition 64 is overlaid onto a lower part of the airbag main body 41. Specifically, the inner side structural fabric portion 66 is overlaid onto a lower part of the corresponding main body fabric portion 43, and the outer side structural fabric portion 69 is overlaid onto a lower part of the corresponding main body fabric portion 44.

The inner side main body forming fabric portion 67 is sewn at its upper periphery to the main body fabric portion 43, and the outer side main body forming fabric portion 70 is sewn at its upper edge to the main body fabric portion 44. The outer joint portion 72 is thus formed. The outer joint portion 72 joins, to the spread main body fabric portions 43, 44, the upper periphery of one of the structural fabric portions 66, 69 that is located closer to the main body fabric portions 43, 44 when tensed.

<Second Joining Step>

As shown in FIG. 8, the rear part of the airbag main body 41 and the rear part of the lateral partition 64 are folded in half along the folding lines 42, 65 in the second joining step (refer to FIG. 7). The airbag main body 41 except for the rear part and the lateral partition 64 except for the rear part are spread.

The spread vertical partition 81 is overlaid onto the partly spread airbag main body 41 and the partly spread lateral partition 64. Prior to the second joining step, the vertical partition 81 is formed by joining the upper and lower fabric pieces 86, 87 to each other by the inner joint portion 93 to form the opening 94 and the pressure regulator valve 97.

Parts of the peripheries 83 of the vertical partition 81 that are not laid on the structural fabric portions 66, 69 are sewn to the main body fabric portions 43, 44, so that a pair of the outer joint portions 84 is formed.

Also, parts of the peripheries 83 that are laid on the structural fabric portions 66, 69 are sewn only to the main body forming fabric portions 67, 70, so that a pair of the outer joint portions 85 is formed.

Through the second joining step, the vertical partition 81, which has the opening 94 and the pressure regulator valve 97, is installed between the main body fabric portions 43, 44, and the extensions (lower ends) of the vertical partition 81 are coupled to the lateral partition 64 (refer to FIG. 13).

The outer joint portions 84 may be formed either before or after the outer joint portions 85 are formed.

<Third Joining Step>

Figure 9:
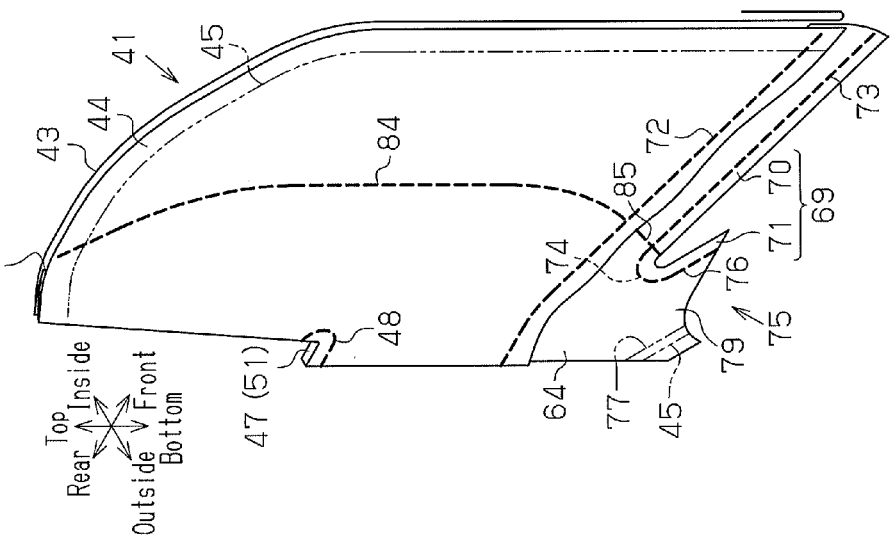
FIG. 9 is an explanatory partial perspective view, with a part of the main body fabric portion cut away, showing a third joining step of the airbag according to the embodiment.

In the third joining step, the partly spread portions in the second joining step (the airbag main body 41, the lateral partition 64, and the vertical partition 81) are folded in half along the folding line 82 (see FIG. 8) as shown in FIG. 9. In this state, the lower peripheries of the main body forming fabric portions 67, 70 are sewn to each other to form the inner joint portion 73 and the opening 74. The front peripheries of the extensions 68, 71 are sewn together to form the joint portion 76, and the rear edges are sewn together to form the joint portion 77. As the joint portions 76, 77 are formed, the check valve 75, which has the valve bodies 78, 79, is formed.

In this manner, in the process of joining the lower peripheries of the structural fabric portions 66, 69 (peripheries farther from the main body fabric portions 43, 44 when the lateral partition 64 is tensed), the opening 74, which connects upper and lower adjoining inflation chambers with the lateral partition in between 64 (the first inflation chamber 61 and the third inflation chamber 63) to each other, and the check valve 75, which selectively opens and closes the opening 74, are formed. That is, the third joining step not only joins the peripheries of the structural fabric portions 66, 69, but also forms the opening 74 and the check valve 75.

At the third joining step, as shown in FIG. 9, parts of the main body fabric portions 43, 44 that are below the outer joint portion 72 are folded upward and outward so that the lateral partition 64 is exposed. In FIG. 9, the outer side main body fabric portion 44 is shown with a part cut away.

The first to third joining steps do not include any particularly difficult process. Subsequent performance of sewing in each joining step installs the lateral partition 64 and the vertical partition 81, which are coupled to each other, between the main body fabric portions 43, 44.

<Fourth Joining Step>

Figure 10:
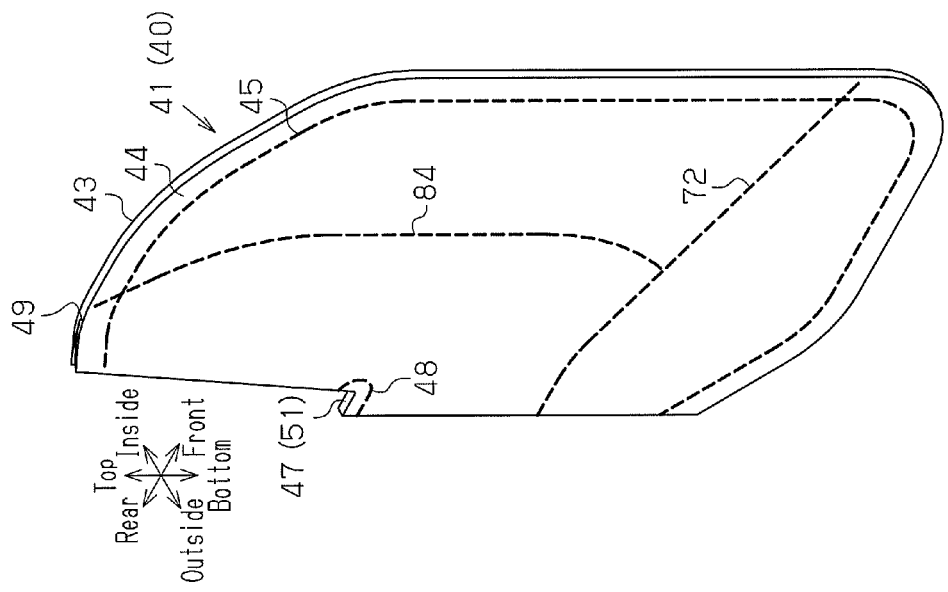
FIG. 10 is an explanatory perspective view showing a fourth joining step of the airbag according to the embodiment.

In the fourth joining step, parts of the main body fabric portions 43, 44 that are above the slit 47 are folded into the remaining parts, so that the inward folding portion 49 is formed as shown in FIGS. 9 and 10. In this state, the peripheries of the main body fabric portions 43, 44 are sewn together to from the peripheral joint portion 45. The peripheral joint portion 45 joins the main body fabric portions 43, 44 to each other and joins (sews together) the upper end of the inward folding portion 49 to the remaining parts of the main body fabric portions 43, 44. In addition, the front ends of the main body forming fabric portions 67, 70 of the lateral partition 64 are joined to (sewn together with) the front ends of the main body fabric portions 43, 44, and the parts of the extension 68, 71 that are rearward of the joint portion 77 are joined to (sewn together with) the rear lower ends of the main body fabric portions 43, 44. Further, the upper end of the folded vertical partition 81 is joined to (sewn together with) the upper ends of the main body fabric portions 43, 44.

In this manner, the airbag 40 is formed, in which the lateral partition 64 and the vertical partition 81 are located between the main body fabric portions 43, 44. As shown in FIG. 10, the peripheral joint portion 45, a part of the endless joint portion 48, and the outer joint portions 72, 84 are exposed as seams on the outer side main body fabric portion 44. In addition of these, the annular joint portions 53 are exposed as seams on the inner side main body fabric portion 43.

Since the airbag 40 in the uninflated and deployed state (see FIGS. 4 to 5B) is folded as shown in FIG. 3, the airbag module AM, which includes the inflator assembly 30 and the airbag 40 as main components, is made into a compact stage form. The airbag module AM is folded in this manner in order that it is suitable for being accommodated in the storage portion 21 having a limited size in the seat back 14.

The bolts 34 extend from the retainer 32 and are passed through the airbag main body 41 (the main body fabric portion 43) and are passed through the side frame portion 17. A nut 35 is threaded onto each bolt 34. The fastening secures the inflator assembly 30 to the side frame portion 17 together with the airbag 40.

The inflator assembly 30 may be fixed to the side frame portion 17 of the vehicle 10 using members other than the bolts 34 and the nuts 35.

As shown in FIG. 1, the side airbag apparatus includes an impact sensor 121 and a controller 122 in addition to the above-described airbag module AM. The impact sensor 121 includes an acceleration sensor and is provided on the body side portion 11 of the vehicle 10 (see FIG. 2) to detect an impact applied on the body side portion 11 from the side. The controller 122 controls the operation of the inflator 31 based on a detection signal from the impact sensor 121.

Furthermore, the vehicle 10 is equipped with a seat belt apparatus for restraining the occupant P seated on the vehicle seat 12. However, illustration of the seat belt apparatus is omitted in FIG. 1.

The side airbag apparatus of the present embodiment is constructed as described above. The typical operation mode will now be described as operation of the side airbag apparatus.

Figures 17A, 17B, 17C:
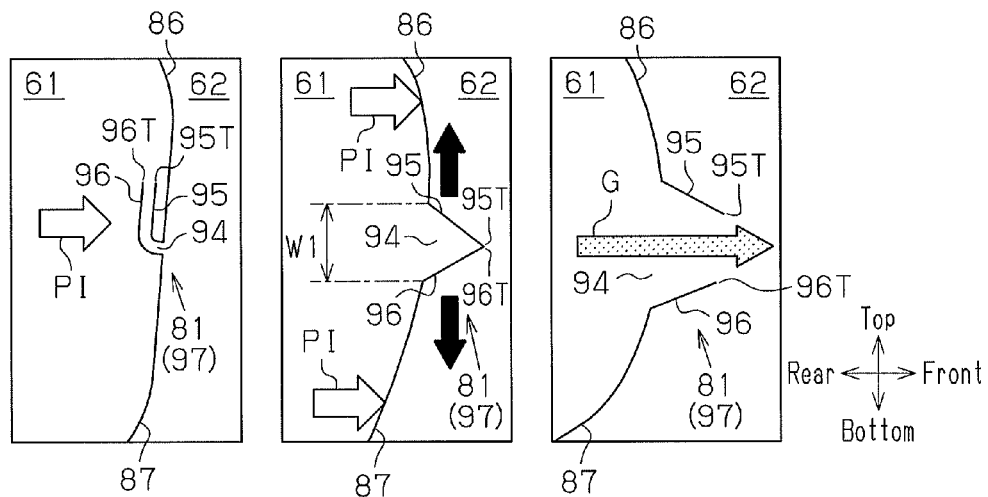
FIGS. 17A to 17C are cross-sectional side views schematically showing operation of the pressure regulator valve of the embodiment.

FIGS. 17A to 17C schematically show the forms of the pressure regulator valve 97 and the vertical partition 81 being changed over time after the inflation gas starts to be supplied, and detailed parts are omitted or simplified.

Figure 19:
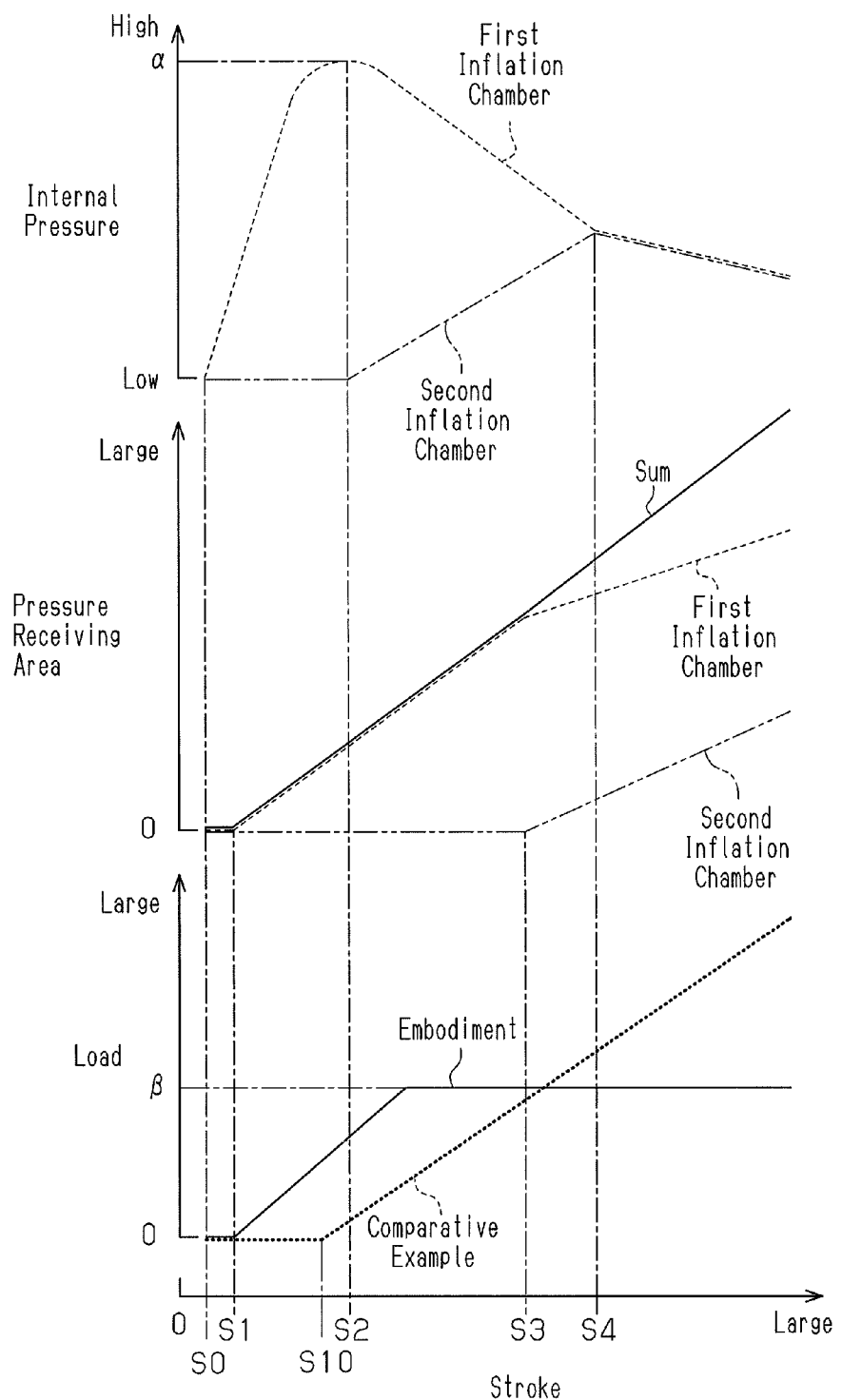
FIG. 19 is a graph showing the relationship between the internal pressure, the pressure receiving area and the load, and the amount of inward bulging of the body side portion in a case where the body side portion bulging inward presses the airbag onto the occupant.
Figure 21:
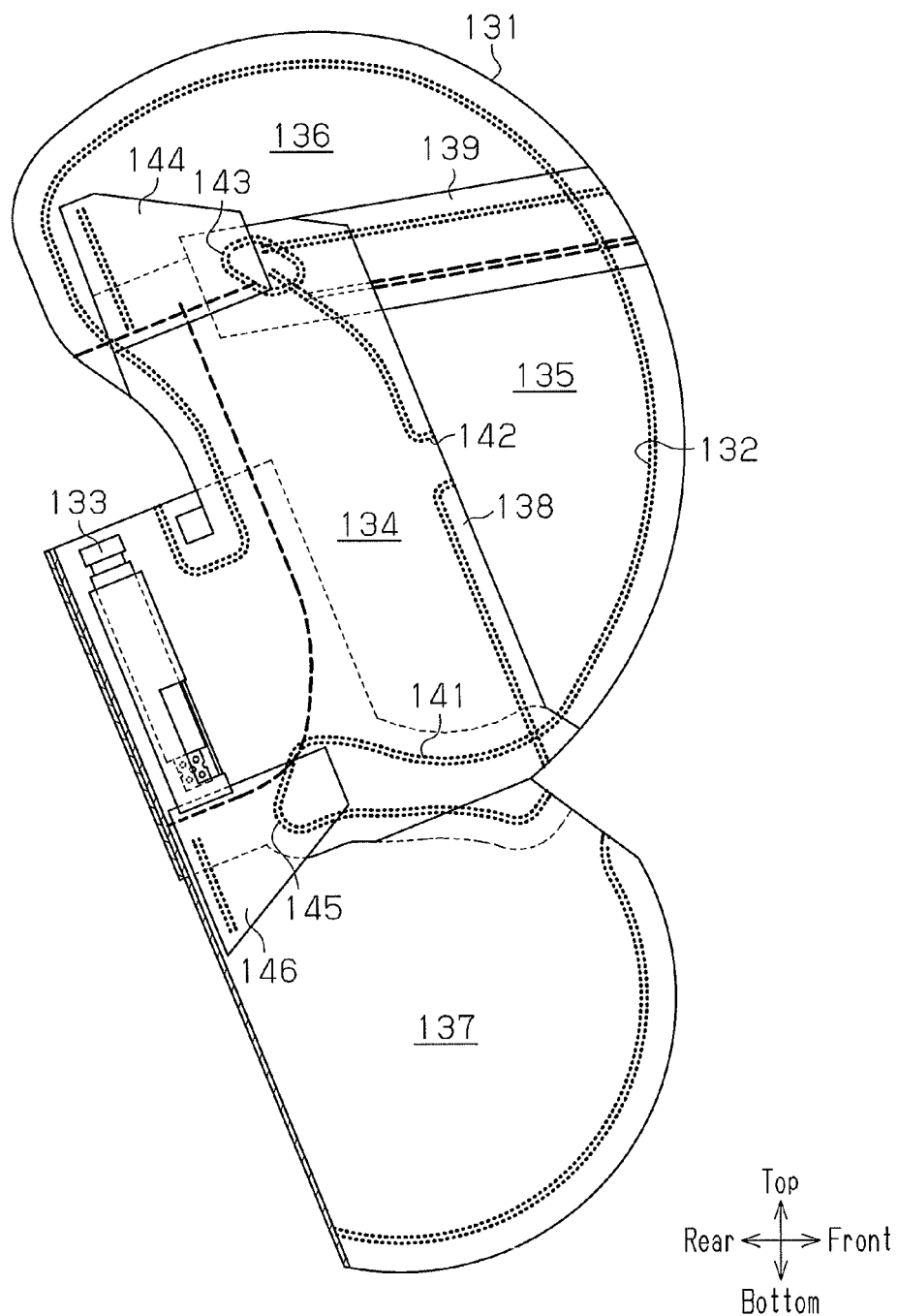
FIG. 21 is a cross-sectional view of a conventional side airbag apparatus, showing the internal structure of an airbag.

FIG. 19 shows how the pressures of the inflation gas in the first and second inflation chambers 61, 62 (internal pressure), the pressure receiving surfaces of occupant P that correspond to the inflation chambers 61, 62, and the load that the occupant P receives from the airbag 40 change in response to the amount of inward bulging (stroke) of the body side portion 11 (stroke). Load is expressed by the product of an internal pressure and a pressure receiving area. To compare the load applied by the first inflation chamber 61 and the load applied by second inflation chamber 62, it is supposed that in FIG. 19 the inflation gas from the inflator 31 is not supplied to the third inflation chamber 63, but supplied only to the first inflation chamber 61 and the second inflation chamber 62.

In the side airbag apparatus, when no impact is applied to the body side portion 11 of the vehicle 10, for example, due to a side collision, the controller 122 sends no activation signal to the inflator 31, so that the inflator 31 does not supply inflation gas to the first inflation chamber 61. The airbag 40 thus remains stored in the storage portion 21 in the storage form (see FIG. 3). At this time, the amount of inward bulging (stroke) of the body side portion 11 is zero. The internal pressures of the inflation chambers 61, 62 are both low (substantially the atmospheric pressure), and the pressure receiving areas and the loads are both zero.

In contrast, when the impact sensor 121 detects that an impact of a magnitude greater than or equal to a predetermined value has been applied to the body side portion 11 of the vehicle 10 due to a side collision or the like while the vehicle 10 is running, the controller 122, based on the detection signal, sends an activation signal to the inflator 31 to activate the inflator 31 (see FIGS. 1 and 2). The amount of inward bulging (stroke) of the body side portion 11 at this time is denoted as S0. In response to the activation signal, the gas generating agent in the inflator 31 generates inflation gas, which is discharged in the direction perpendicular to the axis of the inflator 31 (radial direction). Some of the inflation gas is supplied to the first inflation chamber 61 via the window 33 of the retainer 32, which is shown in FIG. 5A. The inflation gas thus starts inflating the first inflation chamber 61.

On the other hand, a greater amount of inflation gas than that is delivered to the first inflation chamber 61 is caused to flow toward the check valve 75 via the lower open end 32A of the retainer 32. During the period in which the inflator 31 supplies inflation gas to the check valve 75, a force that acts to separate the valve bodies 78, 79 from each other is generated in the valve bodies 78, 79. The inflation gas therefore flows into the third inflation chamber 63 through the opening 74 and through between the valve bodies 78, 79. The inflation gas thus starts inflating the third inflation chamber 63. The lateral partition 64 is pulled in the lateral direction (the vehicle widthwise direction) by the main body fabric portions 43, 44, which form the first inflation chamber 61 and the third inflation chamber 63 in the process of inflation. The continuous supply of the inflation gas from the inflator 31 increases the internal pressure of the third inflation chamber 63.

As the first inflation chamber 61 starts being inflated, the folded vertical partition 81 is pulled in the lateral direction (the vehicle widthwise direction) by the main body fabric portions 43, 44, which form the first inflation chamber 61 being inflated.

As shown in FIG. 17A, an internal pressure PI is applied to the valve bodies 95, 96 of the pressure regulator valve 97 in the overlapping direction (the thickness direction). The internal pressure PI is not as high as the internal pressure of the first inflation chamber 61 when restraining the occupant P or as the internal pressure of the third inflation chamber 63. The valve bodies 95, 96 are brought into close contact in the entire surfaces with each other by the internal pressure PI, and are in a self-sealing state, which restricts the flow of the inflation gas through between the valve bodies 95, 96. Furthermore, the overlapping portions 91, which has been folded and overlaid onto the non-overlapping portion 92 of the vertical partition 81, is pressed against the non-overlapping portion 92 by the internal pressure (see FIG. 16). This allows the valve bodies 95, 96 to be further easily closed.

As shown in FIG. 6, the vertical partition 81 is formed to be longer in the vertical direction (the up-down direction) than in the lateral direction (the vehicle widthwise direction). Thus, in the vertical partition 81, stronger tension tends to be applied in the lateral direction (the vehicle widthwise direction) than in the longitudinal direction (the up-down direction). In the present embodiment, since the opening 94 extends in the lateral direction (the vehicle widthwise direction), in which the strong tension tends to be applied, the opening 94 is easily closed.

Further, when the first inflation chamber 61 is deployed and inflated, strong tension is applied not only to the vertical partition 81 in the lateral direction (the vehicle widthwise direction), but also to the overlapping portions 91 in the same direction. This is because the ends of the overlapping portions 91 are joined to the main body fabric portions 43, 44.

When the valve bodies 95, 96 at least partially contact each other, the pressure regulator valve 97 is closed. The inflation gas in the first inflation chamber 61 is restricted from flowing into the second inflation chamber 62 through between the valve bodies 95, 96 and the opening 94. The restriction of gas flow causes the inflation gas to be accumulated in the first inflation chamber 61, so that the internal pressure of the first inflation chamber 61 mainly starts increasing after the inward bulging amount (stroke) is S0.

In the present embodiment, since the upper space above the lateral partition 64 is divided into the front and rear two inflation chambers by the vertical partition 81, the volume of the first inflation chamber 61 is smaller than that in a case in which the space is not divided. Thus, the internal pressure of the first inflation chamber 61 starts to increase earlier and to a higher level than the case in which the upper space is not divided into two inflation chambers.

At this time, the inflation portion 46 is yet to contact the occupant P, the pressure receiving areas and the loads are both still zero.

Figure 15:
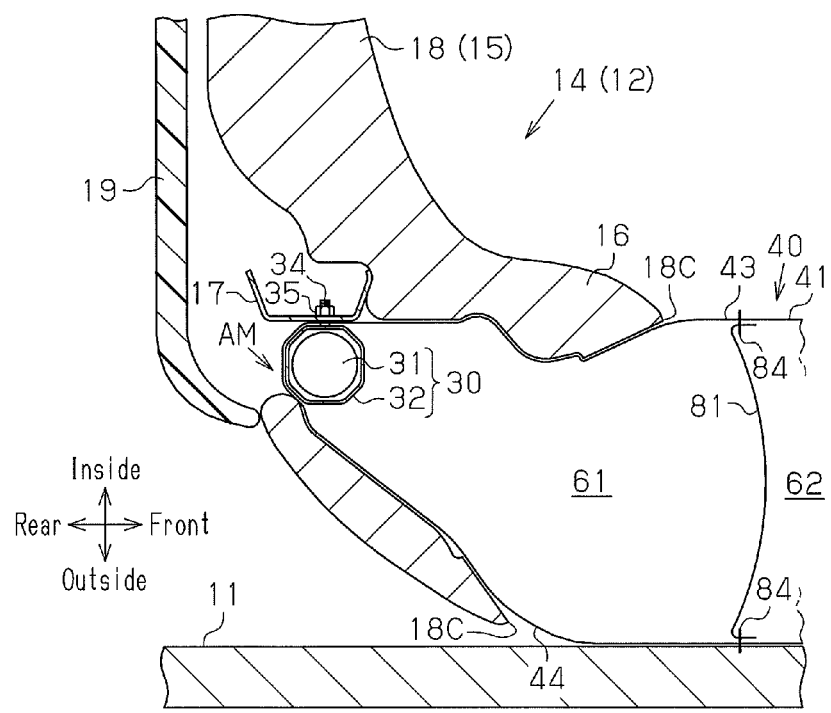
FIG. 15 is a partial cross-sectional plan view illustrating a state in which the airbag main body of FIG. 3 has been projected from the vehicle seat to be deployed and inflated with a part remaining in the seat back.

When the internal pressures increase and the first inflation chamber 61 and the third inflation chamber 63 are inflated, while being unfolded (deployed) in the reverse order of the folding order, the seat pad 18 of the seat back 14 is pushed by the first inflation chamber 61 and the third inflation chamber 63 and breaks at the breakable portion 23 (see FIG. 3). As shown in FIG. 15, the first inflation chamber 61 and the third inflation chamber 63 are projected forward from the seat back 14 through the broken part while parts thereof are remaining in the storage portion 21.

Subsequently, the first inflation chamber 61 and the third inflation chamber 63, which continue being supplied with the inflation gas, are deployed while being unfolded forward between the body side portion 11 and the upper body (the rear half of the shoulder region PS and the lumbar region PP) of the occupant P seated in the vehicle seat 12 as shown in FIG. 2. As shown in FIG. 5A, the third inflation chamber 63, the internal pressure of which is higher than that of the first inflation chamber 61, is deployed and inflated beside the lumbar region PP. Also, the first inflation chamber 61, the internal pressure of which is lower than that of the third inflation chamber 63, is deployed and inflated beside the shoulder region PS and the rear half of the thorax PT. At this time, the second inflation chamber 62 is yet to be inflated or only slightly inflated with a low internal pressure.

As shown in FIG. 16, the vertical partition 81 is tensed when pulled in the lateral direction (the vehicle widthwise direction). The tensed vertical partition 81 limits the thickness of the inflated first inflation chamber 61 in the same direction. In this state, the inflation thickness is greater than that in a case in which the inflation portion 46 is divided into the first inflation chamber 61 and the second inflation chamber 62 without using fabric pieces, that is, by using a means for sewing (what is typically referred to as a seam).

Also, as shown in FIG. 18, the lateral partition 64 is tensed when pulled in the lateral direction (the vehicle widthwise direction). The lateral partition 64 limits the thickness of the inflated first and third inflation chambers 61, 63 in the lateral direction. In this state, the thickness is greater than that in a case in which the inflation portion 46 is divided into the first inflation chamber 61 and the third inflation chamber 63, for example, by sewing and without using fabric pieces.

When the inward bulging amount (stroke) of the body side portion 11 reaches value S1, the shoulder region PS of the occupant P starts being pushed toward the center of the vehicle by the first inflation chamber 61. As the first inflation chamber 61 pushes the shoulder region PS and the rear half of the thorax PT and as the third inflation chamber 63 pushes the lumbar region PP, the occupant P is moved inward and restrained. By this movement, the distance between the occupant P and the body side portion 11 is increased, and the space for deploying and inflating the second inflation chamber 62 is ensured.

At the pushing action by the inflation chambers, only the first inflation chamber 61 of the inflation chambers above the lateral partition 64 is deployed and inflated. The occupant P thus mostly contacts the first inflation chamber 61 while receiving the pressure of the inflation portion 46. Therefore, the size of area by which the occupant P receives the pressure of the inflation portion 46 (the pressure receiving area corresponding to the inflation portion 46) is equal to the small size of the area of the surface receiving the pressure of the first inflation chamber 61 (the pressure receiving area corresponding to the first inflation chamber 61). However, the pressure receiving area corresponding to the first inflation chamber 61 increases as the inward bulging of the body side portion 11 due to the impact of the side collision progresses and the inward bulging amount increases.

The load of the impact received the occupant P via the inflation portion 46 is also increased as the pressure receiving area and the internal pressure increase. As described above, the internal pressure of the first inflation chamber 61 starts increasing at an early stage. Therefore, as obvious from FIG. 19, in the present embodiment, the inward bulging amount S1, at which the load starts increasing, is smaller than the inward bulging amount S10, at which the load starts increasing in a comparison example that is equivalent to Patent Document 1. This is because the inflation chamber above the lateral partition 64 is not divided in the comparison example. That is, in the present embodiment, the load starts increasing at earlier timing than in a case in which the inflation chamber above the lateral partition 64 is not divided (Patent Document 1). Accordingly, the load reaches a predetermined value β for protecting the upper body of the occupant P from the impact (see FIG. 19) at earlier timing.

When the inward bulging amount of the body side portion 11 reaches value S2, while the inflation gas keeps being supplied to the first inflation chamber 61 with the valve bodies 95, 96 closely contacting each other in the entire surfaces and are closed, the external force applied to the body side portion 11 increases the internal pressure of the first inflation chamber 61. When the thus increased internal pressure reaches a value α, the pressure regulator valve 97 starts opening.

That is, the inflation portion 46 starts being deformed by external force that accompanies the restraint of the occupant P in the middle of the supplying period of the inflation gas to the inflation chambers above the lateral partition 64. Accordingly, the tension strongly applied to the vertical partition 81 in the lateral direction is decreased, and the tension applied in the vertical direction is increased.

Also, the internal pressure of the first inflation chamber 61 is further increased in accordance with the deformation of the inflation portion 46, and the vertical partition 81 is pushed toward the second inflation chamber 62 (see FIG. 17B). Thus, the tension applied to the vertical partition 81 is changed. As the tension is changed, the difference between the tension acting in the vertical direction and the tension acting in the lateral direction is reduced. Then, the opening 94 located on the vertical partition 81 is permitted to be deformed, and the valve bodies 95, 96 on the vertical partition 81 are permitted to operate.

The overlapping portions 91 are overlapped with the non-overlapping portions 92, and are joined to the main body fabric portions 43, 44 by the outer joint portions 84 at the ends in the lateral direction. Therefore, the force that acts to maintain the overlapped state is strong at the parts of the overlapping portions 91 close to the outer joint portions 84. However, the force is reduced as the distance from the outer joint portions 84 is increased, and the force is minimized at the center in the lateral direction, that is, on the valve bodies 95, 96. Thus, the overlapping portions 91, which are pulled in the vertical direction, are deformed in the vertical direction at the valve bodies 95, 96 and in the vicinity thereof.

When the opening 94 is opened in the vertical direction by a certain amount, only the valve bodies 95, 96 of the overlapping portions 91, which have received high internal pressure PI of the first inflation chamber 61, are pushed out into the second inflation chamber 62 via the opening 94 and reversed. When the vertical width W1 of the opening 94 is narrow, the distal ends 95T, 96T contact each other to close the pressure regulator valve 97.

Then, as the width W1 of the opening 94 increases, the distal ends 95T, 96T separate from each other to open the pressure regulator valve 97 as shown in FIG. 17C. At this time, the restriction of flow is cancelled so that the inflation gas G in the first inflation chamber 61 is permitted to flow to the second inflation chamber 62 via the opening 94 and between the valve bodies 95, 96.

As the inflation gas flows out, the internal pressure of the first inflation chamber 61 switches from increasing to decreasing. At this time, however, the body side portion 11 continues bulging inward and the inflation portion 46 continues to push the occupant P at the first inflation chamber 61. The pressure receiving area of the occupant P corresponding to the first inflation chamber 61 keeps increasing.

When the inward bulging amount reaches value S2, the second inflation chamber 62 starts being inflated by inflowing inflation gas, and the internal pressure of the second inflation chamber 62 starts increasing. This causes the second inflation chamber 62 to be unfolded in the reverse order of that when it is folded.

At this time, the second inflation chamber 62 is deployed and inflated beside the front half of the thorax PT, which has a lower impact resistance than the shoulder region PS, with an internal pressure lower than that of the first inflation chamber 61. In this state, the first inflation chamber 61 and the third inflation chamber 63 have increased the space between the body side portion 11 and the occupant P, and the space for deploying and inflating the second inflation chamber 62 is ensured. Therefore, compared to a case in which such an increase in the space does not takes place, the second inflation chamber 62 can be easily deployed and inflated.

When the inward bulging amount reaches value S3 slightly after the start of increase in the internal pressure of the second inflation chamber 62, the body side portion 11, which is bulging inward, starts pressing the second inflation chamber 62 against the upper body of the occupant P, in addition to the first inflation chamber 61. That is, the upper body starts being restrained by the second inflation chamber 62 in addition to the first inflation chamber 61. Accordingly, the area by which the occupant P receives the pressure of the second inflation chamber 62 (the pressure receiving area that corresponds to the second inflation chamber 62) starts increasing.

The internal pressure of the first inflation chamber 61 and the internal pressure of the second inflation chamber 62 are equalized after the inward bulging amount reaches value S4.

Since the third inflation chamber 63 extends over the first inflation chamber 61 and the second inflation chamber 62, the third inflation chamber 63 is deployed and inflated not only below the first inflation chamber 61, but also below the second inflation chamber 62. Therefore, since the third inflation chamber 63 is deployed and inflated also below the second inflation chamber 62, the third inflation chamber 63 is deployed and inflated forward in a wider range than in the case where the third inflation chamber 63 is deployed and inflated only below the first inflation chamber 61.

The airbag 40, in which the first inflation chamber 61, the second inflation chamber 62, and the third inflation chamber 63 are each deployed and inflated as described above, is located between the upper body of the occupant P and the inwardly bulging body side portion 11. The airbag 40 pushes the upper body inward of the vehicle and restrains the upper body. The side impact transmitted to the upper body through the body side portion 11 is reduced by the inflation portion 46 and the upper body is protected. Particularly, a range of the lumbar region PP that is large in the front-rear direction is restrained and protected by the third inflation chamber 63, which is deployed and inflated below both the first inflation chamber 61 and the second inflation chamber 62.

As described above, after the pressure regulator valve 97 is opened and the amount of inward bulging (stroke) reaches value S2, the internal pressure of the first inflation chamber 61 is lowered and the internal pressure of the second inflation chamber 62 is increased. The pressure receiving area of the occupant P that corresponds to the first inflation chamber 61 and the pressure receiving area that corresponds to the second inflation chamber 62 increase at different timings. Therefore, after the inward bulging amount (stroke) reaches value S2, the load that the occupant P receives from the entire inflation portion 46, that is, the sum of the load applied by the first inflation chamber 61 and the load applied by the second inflation chamber 62, is lower than the maximum value of a case in which the inflation portion is formed by a single inflation chamber and the pressure regulator valve 97 is not provided (Patent Document 1). Further, the total load is substantially a constant value (a predetermined value β).

The impact resistance of the upper body of the occupant P is generally higher in the rear half of the upper body than in the front half. This is because the rear half includes the spine and the ribs are connected to the spine at the rear ends, while the front ends of the ribs are not connected to any structure having a strength as the spine. Therefore, as the inflation chambers above the lateral partition 64 are deployed and inflated, the internal pressure of the inflation portion 46 that acts on the side of the upper body of the occupant P is preferably lower in the front half than in the rear half.

In this respect, the inflation chambers above the lateral partition 64 are inflated such that the vertical partition 81 is located in the vicinity of the boundary between the front half and the rear half of the upper body with respect to the front-rear direction in the present embodiment. When the inflation portion 46 is deployed and inflated, the first inflation chamber 61 is located in the vicinity of the side of the rear half, and the second inflation chamber 62 is located in the vicinity of the side of the front half. Therefore, at an initial stage of the restraint of the occupant P by the airbag 40, the rear half, which has a higher impact resistance than the front half, is pushed by the first inflation chamber 61, the internal pressure of which is increased at an early stage. Also, at the initial stage of the restraint, the front half, which has a relatively low impact resistance, is pressed by the second inflation chamber 62, the internal pressure of which is not as increased as that of the first inflation chamber 61.

When the discharge of inflation gas from the inflator 31 stops and the inflation gas in the third inflation chamber 63 acts to flow to the first inflation chamber 61, the valve bodies 78, 79 of the check valve 75 are pushed by the high pressure in the third inflation chamber 63 and contact each other. When the check valve 75 is closed, the inflation gas in the third inflation chamber 63 is restricted from flowing back to the first inflation chamber 61 through between the valve bodies 78, 79 and the opening 74.

Therefore, the internal pressure of the third inflation chamber 63, which has been increased to a level adequate for protecting the lumbar region PP of the occupant P, is maintained at the high level.

Thereafter, while allowing inflation gas to flow from the first inflation chamber 61 to the third inflation chamber 63, the check valve 75 restricts the inflation gas in the third inflation chamber 63 from flowing back to the first inflation chamber 61. Therefore, if, for example, the internal pressure of the third inflation chamber 63 is increased as the side airbag apparatus restrains the lumbar region PP of the occupant P, the check valve 75 restricts the inflation gas in the third inflation chamber 63 from flowing out to the first inflation chamber 61. The internal pressure of the first inflation chamber 61 is unlikely to be increased under the influence of pressure fluctuation of the third inflation chamber 63 that accompanies the restraint of the lumbar region PP.

The present embodiment described above has the following advantages.

(1) The inflation portion 46 of the airbag main body 41 is divided into a first inflation chamber 61, which is deployed and inflated by being supplied with inflation gas, a second inflation chamber 62, which is located in front of the first inflation chamber 61 with the vertical partition 81 in between, and a third inflation chamber 63, which is located below the first inflation chamber 61 with the lateral partition 64 in between. The vertical partition 81 has the opening 94 and the pressure regular valve 97, and the lateral partition 64 has the opening 74 and the check valve 75 (FIG. 5A).

Therefore, the internal pressures of the first inflation chamber 61 and the second inflation chamber 62 can be regulated by the pressure regulator valve 97. Thus, the performance for restraining and protecting occupant P is improved compared to Patent Document 1, in which the opening 142 is located between the first inflation chamber 134 and the second inflation chamber 135, and the openings 143, 145 and the check valves 144, 146 are located between the first inflation chamber 134 and the third inflation chambers 136, 137.

(2) The pressure regulator valve 97 is configured to include the valve bides 95, 96, which are located about the opening 94. Before the first inflation chamber 61 restrains the occupant P, the valve bodies 95, 96 are pushed by the inflation gas in the first inflation chamber 61 to contact each other or to be brought close to each other (FIG. 17A). Also, when the first inflation chamber 61 restrains the occupant P, the accompanying external force flexes the valve bodies 95, 96 via the vertical partition 81 to be separated from each other (FIGS. 17B and 17C).

Therefore, by using the thus configured pressure regulator valve 97, the pressure regulator valve 97 is closed before the first inflation chamber 61 restrains the occupant P, so that the inflation gas is restricted from flowing from the first inflation chamber 61 to the second inflation chamber 62 via the opening 94. Also, when the first inflation section 61 restrains the occupant P, the pressure regulator valve 97 is opened to cancel the restriction.

(3) The first inflation chamber 61 and the second inflation chamber 62 are configured to be deployed and inflated beside the thorax PT of the occupant P seated in the vehicle seat 12 (FIG. 5A).

Therefore, the first inflation chamber 61 and the second inflation chamber 62 are deployed and inflated beside the thorax PT, which has a lower impact resistance than the remaining parts of the upper body of the occupant P, with an internal pressure lower than that of the third inflation chamber 63 located blow, so that thorax PT is pushed and restrained with a pressure suitable for the impact resistance of the thorax PT (a pressure lower than the pressure applied to the remainder of the upper body). The thorax PT is thus effectively protected from the impact.

(4) The third inflation chamber 63 is located below the first inflation chamber 61 and is configured to be deployed and inflated beside the lumbar region PP of the occupant P seated in the vehicle seat 12 (FIG. 5A).

Therefore, the third inflation chamber 63 is deployed and inflated beside the lumbar region PP, which has a higher impact resistance than the thorax PT of the upper body of the occupant P, with an internal pressure higher than that of the first inflation chamber 63 located above, so that the lumbar region PP is pushed and restrained with a pressure suitable for the impact resistance of the lumbar region PP (a pressure higher than the pressure applied to the thorax PT). The lumbar region PP is thus effectively protected from the impact.

(5) The vertical partition 81 is formed by a fabric piece that, as the first inflation chamber 61 is inflated, is tensed in the widthwise direction (lateral direction) of the vehicle seat 12 to limit the inflated thickness of the first inflation chamber 61 in the same direction (FIG. 16).

Therefore, by forming the vertical partition 81 to have adequate dimensions, the first inflation chamber 61 can be inflated to have a thickness suitable for absorbing the energy of impact in a side collision to restrain and protect the occupant P.

(6) The lateral partition 64 is formed by a fabric piece that, as the first inflation chamber 61 is inflated, is tensed in the widthwise direction (lateral direction) of the vehicle seat 12 to limit the inflated thicknesses of the first and third inflation chambers 61, 63 in the same direction (FIGS. 14 and 18).

Therefore, by forming the lateral partition 64 to have adequate dimensions with respect to the lateral direction of the vehicle seat 12, the first inflation chamber 61 and the third inflation chamber 63 can be inflated to have thicknesses suitable for absorbing the energy of impact in a side collision, thereby restraining and protect the occupant P.

(7) The third inflation chamber 63 is formed to extend over the first inflation chamber 61 and the second inflation chamber 62 in the front-rear direction of the vehicle seat 12 (FIG. 5A).

Thus, compared to a case in which the third inflation chamber 63 is provided only below the first inflation chamber 61, the third inflation chamber 63 is deployed and inflated in an area wider forward. Accordingly, the lumbar region PP of the occupant P can be restrained and protected in a wider range in the front rear direction.

The above embodiment may be modified as follows.

<Regarding Inflator Assembly 30>

The retainer 32 may have a closed lower end and an open upper end, or may have open upper and lower ends.

The inflator 31 may be directly attached to the seat back 14 (the side frame portion 17) without using the retainer 32.

The inflator assembly 30 may be entirely located inside the inflation portion 46 (the first inflation chamber 61).

The inflator assembly 30 may be entirely located outside the airbag 40. In this case, the inflator 31 and the first inflation chamber 61 are connected by a tube, and the inflation gas from the inflator 31 may be supplied to the first inflation chamber 61 from the inflator 31 via the tube.

<Regarding Inflation Portion 46>

The substantially entire airbag 40 may be formed of the inflation portion 46 as in the above-illustrated embodiment, but may also partially include a non-inflation portion, which neither supplied with inflation gas nor inflated.

In the side of an occupant, the shoulder region PS is generally known to have a higher impact resistance than that of the thorax PT. Therefore, the impact that is applied to the upper body of the occupant from the airbag main body 41 via the inflation portion 46 is desirably smaller in the thorax PT than in the shoulder region PS.

Thus, as shown in FIGS. 20A and 20B, the lateral partition 64 may be locates above the vertical partition 81, not below, so that the third inflation chamber 63 is located above the first inflation chamber 61 and the second inflation chamber 62, not below.

In this case, a lower part of the first inflation chamber 61 may be configured to be deployed and inflated beside the lumbar region PP as shown in FIG. 20A or may be configured to be deployed and inflated beside an upper part of the lumbar region PP as shown in FIG. 20B.

With these configurations of the side airbag apparatus, when an impact is applied to the vehicle 10 from beside the vehicle seat 12, the third inflation chamber 63 is deployed and inflated beside the shoulder region PS, which has, in the upper body of the occupant P, a higher impact resistance than the thorax PT, with an internal pressure that is higher than that of the first inflation chamber 61 below. The shoulder region PS is thus pressed by the third inflation chamber 63 with a higher pressure applied to the thorax PT. In this manner, the third inflation chamber 63 is deployed and inflated with a pressure that corresponds to the impact resistance of the shoulder region PS of the occupant P, so that the shoulder region PS is effectively protected from an impact by the third inflation chamber 63.

Each of FIGS. 20A, 20B, and FIG. 20C, which will be discussed below, schematically shows the arrangement of the vertical partition 81 and the lateral partition 64 in the inflation portion 46 of the airbag 40, and the details of the openings 74, 94, the check valve 75, and the pressure regulator valve 97 are omitted or simplified in these drawings.

As shown in FIG. 20C, an additional lateral partition 64 may be provided above the vertical partition 81, in addition to the one below, so that an additional third inflation chamber 63 is provided above the first inflation chamber 61 and the second inflation chamber 62, in addition to the one b below.

As shown in FIG. 20C, the first inflation chamber 61 may be deployed and inflated beside the rear half of the thorax PT, and the second inflation chamber 62 may be deployed and inflated beside the front half of the thorax PT. Also, the lower third inflation chamber 63 may be deployed and inflated beside the lumbar region PP, and the upper third inflation chamber 63 may be deployed and inflated beside the shoulder region PS.

In the above described embodiment and the modifications shown in FIGS. 20A to 20C, the third inflation chamber 63 may be provided below only the first inflation chamber 61. In this case, compared to the case in which the third inflation chamber 63 is provided over both the first inflation chamber 61 and the second inflation chamber 62, the third inflation chamber 63 is deployed and inflated in a narrower range in the front-rear direction. However, since the third inflation chamber 63 is deployed and inflated beside at least a part of the lumbar region PP, with an internal pressure higher than that of the first inflation chamber 61, the lumbar region PP is effectively restrained and protected from an impact.

The part of the side of the body of the occupant P to be restrained and protected by the first inflation chamber 61 and the second inflation chamber 62 may be different from that of the above illustrated embodiment.

For example, the first inflation chamber 61 may be deployed and inflated beside the front half of the thorax PT, and the second inflation chamber 62 may be deployed and inflated beside the space in front of the thorax PT. In this case, the second inflation chamber 62 may be configured to receive inflation gas that has flowed from the first inflation chamber 61, thereby adjusting the internal pressure of the first inflation chamber 61.

<Regarding Lateral Partition 64>

In place of the tether extending between the main body fabric portions 43 and 44 of the airbag body 41, the lateral partition 64 may be formed by a seam that is generated by bringing the main body fabric portions 43, 44 in contact with each other and sewing (joining) these together.

<Regarding Vertical Partition 81>

At least one of the upper fabric piece 86 and the lower fabric piece 87 of the vertical partition 81 may be divided into two along the folding line 82.

The peripheries 83 of the vertical partition 81 may be joined to the main body fabric portions 43, 44 either inside the first inflation chamber 61 or inside the second inflation chamber 62.

Also, one of the peripheries 83 may be joined inside the first inflation chamber 61, and the other periphery 83 may be joined inside the second inflation chamber 62.

The opening 94 does not necessarily need to extend in the direction perpendicular to the folding line 82 of the vertical partition 81, but may extend in a direction diagonal to the folding line 82 or in a direction along the folding line 82.

The vertical partition 81 may be formed of a single member (fabric piece).

Parts of the overlapping portions 91 that correspond to the opening 94 (parts in the vicinity of the opening 94, or more accurately, parts between the opening 94 and the edges 88E, 89E) function as the valve bodies 95, 96. Therefore, as long as at least the distal ends 95T, 96T of the valve bodies 95, 96 are in contact with each other and are closed when the first inflation chamber 61 is deployed and inflated, parts of the overlapping portions 91 that do not correspond to the opening 94 (parts not in the vicinity) may be modified. For example, parts of the overlapping portions 91 that do not correspond to the opening 94 (parts not in the vicinity) may be joined partially or entirely. The joining means may be sewing or adhering. According to this modification, only parts of the overlapping portions 91 that correspond to the opening 94 operate as the valve bodies 95, 96, and parts of the overlapping portions 91 that do not correspond to the opening 94 are prevented from unnecessarily moving, for example, flapping.

Furthermore, a cutout may be formed at least at part of the portion of the overlapping portions 91 that does not correspond to the opening 94.

The vertical partition 81 may be formed by a member different from the members forming the valve bodies 95, 96.

The folding line 82 of the vertical partition 81 when folded in half may be slightly inclined with respect to the up-down direction of the airbag module AM.

The portion to be disjoined is canceled in the inner joint portion 93 does not necessarily have to be provided at a portion that extend across the folding line 82, but may be provided at a portion displaced away from the folding line 82 in the direction perpendicular to the folding line 82.

The inner joint portions 93 may be disjoined at two or more positions.

The overlapping portions 91, which include the valve bodies 95, 96, may be provided in the second inflation chamber 62 instead of the first inflation chamber 61, prior to deployment and inflation of the inflation portion 46.

The vertical partition 81, which is folded in half by being folded along the folding line 82 such that the opposite peripheries 83, which face each other, are brought close to each other, may be provided in the inflation portion 46 that is in the uninflated and deployed state in the state in which the folding line 82 is located downstream of the opposite peripheries 83. In this case, the overlapping portions 91, which have the valve bodies 95, 96, may be located in the second inflation chamber 62 before the inflation portion 46 is deployed and inflated.

The edges 88E, 89E of the ends 88, 89 of the upper and lower fabric pieces 86, 87 of the vertical partition 81 may be overlaid onto each other in a band-like shape to form a pair of overlapping portions 91.

The vertical partition 81 may have a shape different from that in the above illustrated embodiment. In this case, the outer shape of the vertical partition 81 is preferably changed in accordance with a part of the upper body of the occupant P to be restrained and protected by the first inflation chamber 61. Accordingly, the structure of the outer joint portion 84, which joins the vertical partition 81 to the main body fabric portions 43, 44, is different from that in the above illustrated embodiment. For example, when protecting the shoulder region PS of the occupant P in a wider area, the outer joint portion 84 may be provided forward of its position in the above illustrated embodiment. For example, a part of the outer joint portion 84 that joins the upper fabric piece 86 to the main body fabric portions 43, 44 may be inclined forward toward the upper end.

When the airbag main body 41 is deployed and inflated, the vertical partition 81 may be located at the front end of the side support portion 16 of the vehicle seat 12 or a position that is slightly forward of the front end.

<Regarding Storage Portion 21 of Airbag Module AM>

Instead of the backrest 14 of the vehicle seat 12, a part that corresponds to the storage portion 21 may be located in the body side portion 11 to accommodate the airbag module AM.

<Regarding Check Valve 75>

The check valve 75 may be formed by a member separate from the lateral partition 64.

<Other Modifications>

The part of the upper body of the occupant P to be protected by the side airbag apparatus may be different from that in the above illustrated embodiment.

The present invention may be applied to a side airbag apparatus of a vehicle in which a seat 12 that faces in a direction other than the forward direction, for example, sideways. In this case, when an impact is applied to a side of the vehicle seat 12 (in the front-rear direction of the vehicle), the side airbag apparatus protects an occupant P from the impact.

Vehicles to which the side airbag apparatus according to the present invention is applied include various industrial vehicles in addition to private automobiles.

The above described side airbag apparatus may also be applied to an airbag apparatus installed in the seats in vehicles other than cars, including aircrafts and ships.

The invention claimed is:

1. A side airbag apparatus comprising:
  an airbag main body including an inflation portion, wherein the inflation portion is inflated by inflation gas supplied thereto in response to an impact applied to a side of a vehicle seat of a vehicle, the airbag main body is deployed forward on the side of the vehicle seat, and wherein the inflation portion includes:
    a first inflation chamber, which is deployed and inflated by being supplied with the inflation gas;
    a second inflation chamber, which is located in front of and adjacent to the first inflation chamber;
    a vertical partition, which separates the first inflation chamber and the second inflation chamber from each other;
    a third inflation chamber, which is adjacent to and located above or below the first inflation chamber, wherein the third inflation chamber is deployed and inflated by the inflation gas with an internal pressure that is higher than the inflation pressure of the first inflation chamber; and
    a lateral partition, which separates the first inflation chamber and the third inflation chamber from each other,
    wherein the vertical partition and the lateral partition each have an opening;
  a pressure regulator valve provided in the vertical partition, wherein when the first inflation chamber is inflated before starting restraining an occupant, the pressure regulator valve is closed to restrict the inflation gas from flowing from the first inflation chamber to the second inflation chamber through the opening, and when the first inflation chamber restrains the occupant, the pressure regulator valve opens in response to a change in the tensed state of the vertical partition due to an applied external force generated by the restraint, thereby cancelling the restraint, and
  a check valve provided in the lateral partition to restrict flow of the inflation gas from the third inflation chamber to the first inflation chamber,
  wherein the vertical partition is formed by a fabric piece and the lateral partition is formed by another fabric piece,
  wherein the vertical partition and the lateral partition are joined to the airbag main body, respectively, and the vertical partition is joined to the lateral partition, thereby forming the first inflation chamber, the second inflation chamber, and the third inflation chamber,
  wherein the lateral partition is formed by folding a single fabric piece in half along a folding line set at a center portion thereof to be overlaid onto itself in a widthwise direction of the vehicle, the single fabric piece being the another fabric piece, or the lateral partition is formed of two fabric pieces divided along the folding line, the two fabric pieces including the another fabric piece, and thereby the lateral partition comprises two fabric portions,
  wherein the two fabric portions are joined by an inner joint portion located at peripheries thereof, and
  wherein the lateral partition has an opening and a check valve, the opening of the lateral partition is formed by a disjoined part where the inner joint portion is not provided, and the check valve configured to restrict the flow of inflation gas at the opening of the lateral partition.

2. The side airbag apparatus according to claim 1, wherein the pressure regulator valve has a pair of valve bodies provided about the opening in the lateral partition,
  before the first inflation chamber restrains the occupant, the valve bodies of the pressure regulator valve are pressed to approach or contact each other so that the pressure regulator valve is closed, and
  when the first inflation chamber restrains the occupant, the valve bodies of the pressure regulator valve are flexed and separated from each other by external force that accompanies the restraint via the vertical partition so that the pressure regulator valve is opened.

3. The side airbag apparatus according to claim 1, wherein the first inflation chamber and the second inflation chamber are deployed and inflated beside the thorax of an occupant seated in the vehicle seat.

4. The side airbag apparatus according to claim 3, wherein the third inflation chamber is located above the first inflation chamber, and
  the third inflation chamber is deployed and inflated beside the shoulder region of the occupant seated in the vehicle seat.

5. The side airbag apparatus according to claim 3, wherein the third inflation chamber is located below the first inflation chamber, and
  the third inflation chamber is deployed and inflated beside the lumbar region of the occupant seated in the vehicle seat.

6. The side airbag apparatus according to claim 1, wherein as the first inflation chamber is inflated, the fabric piece of the vertical partition is tensed in a widthwise direction of the vehicle seat and restricts the thickness of the inflated first inflation chamber.

7. The side airbag apparatus according to claim 1, wherein as the first inflation chamber is inflated, the fabric piece of the lateral partition is tensed in a widthwise direction of the vehicle seat and restricts the thickness of the inflated first inflation chamber and the thickness of the inflated third inflation chamber.

8. The side airbag apparatus according to claim 1,
  wherein the third inflation chamber is located to extend over the first inflation chamber and the second inflation chamber in a front-rear direction of the vehicle seat.

9. The side airbag apparatus according to claim 1,
  wherein the third inflation chamber which is deployed and inflated by the inflation gas is tensed in the vehicle widthwise direction to limit a thickness of the inflation portion in the vehicle widthwise direction.

* * * * *